(12) United States Patent
Bartels

(10) Patent No.: US 11,834,284 B2
(45) Date of Patent: Dec. 5, 2023

(54) UNBINDING APPARATUS, METHODS, AND SYSTEMS

(71) Applicant: Brian Kenneth Arthur Bartels, Quesnel (CA)

(72) Inventor: Brian Kenneth Arthur Bartels, Quesnel (CA)

( * ) Notice: Subject to any disclaimer, the term of this patent is extended or adjusted under 35 U.S.C. 154(b) by 648 days.

(21) Appl. No.: 16/887,931

(22) Filed: May 29, 2020

(65) Prior Publication Data

US 2021/0371218 A1 Dec. 2, 2021

(51) Int. Cl.
*B65G 67/24* (2006.01)
*B65G 69/28* (2006.01)
*B60P 3/41* (2006.01)

(52) U.S. Cl.
CPC ......... *B65G 67/24* (2013.01); *B65G 69/2847* (2013.01); *B65G 69/2882* (2013.01); *B60P 3/41* (2013.01); *B65G 2201/0282* (2013.01)

(58) Field of Classification Search
CPC ............... B65G 67/24; B65G 69/2847; B65G 69/2882; B65G 2201/0282; B60P 3/41
See application file for complete search history.

(56) References Cited

U.S. PATENT DOCUMENTS

| | | | | |
|---|---|---|---|---|
| 3,939,996 A | * | 2/1976 | Golob | A01G 23/085 280/145 |
| 6,152,511 A | * | 11/2000 | Gustafson | B62D 33/08 296/26.06 |
| 10,624,279 B1 | * | 4/2020 | Mead | A01G 23/093 |
| 2002/0009345 A1 | * | 1/2002 | Clive-Smith | B65D 90/006 410/32 |
| 2009/0028677 A1 | * | 1/2009 | Williams | B60P 3/41 414/539 |
| 2013/0170941 A1 | * | 7/2013 | Drott | B65D 88/129 211/49.1 |
| 2013/0294880 A1 | * | 11/2013 | Sillery | B60P 3/41 414/800 |
| 2015/0253151 A1 | * | 9/2015 | Inberg | B60D 1/62 702/33 |
| 2018/0194266 A1 | * | 7/2018 | Käppi | B60P 3/41 |

(Continued)

*Primary Examiner* — Saul Rodriguez
*Assistant Examiner* — Ashley K Romano
(74) *Attorney, Agent, or Firm* — Kilpatrick Townsend & Stockton LLP

(57) ABSTRACT

Aspects of unbinding apparatus, methods, and systems are disclosed. One aspect disclosed herein is an apparatus for unbinding a stacked load of logs. For example, the apparatus may comprise: a plurality of support arms movable toward a plurality of side surfaces of the stacked load, each support arm of the plurality of support arms comprising a guide surface and being: adjustable to abut against one or more side surfaces of the plurality of side surfaces; and independently movable relative to the plurality of support arms in one or more directions responsive to a physical shape of the one or more side surfaces to establish a formfitting abutment between the plurality of support arms and the plurality of side surfaces. In this example, once the formfitting abutment is established, the guide surfaces of the plurality of support arms may be positioned and operative to guide a log released from the stacked load along an escape path over and away from an unbinding area adjacent the stacked load. Aspects of related methods and systems also are disclosed herein.

47 Claims, 18 Drawing Sheets

(56) References Cited

U.S. PATENT DOCUMENTS

| | | | |
|---|---|---|---|
| 2018/0370773 A1* | 12/2018 | Biadun | B66C 1/68 |
| 2019/0066038 A1* | 2/2019 | O'Brien | B65G 67/24 |
| 2020/0196526 A1* | 6/2020 | Koch | B65G 67/24 |
| 2020/0331730 A1* | 10/2020 | Palmroth | B66C 23/54 |
| 2021/0007295 A1* | 1/2021 | Iyer | B60P 3/41 |
| 2022/0080874 A1* | 3/2022 | Busiahn | B66D 1/06 |
| 2022/0228905 A1* | 7/2022 | Halonen | E02F 9/264 |

* cited by examiner

UNBINDING APPARATUS, METHODS, AND SYSTEMS

BACKGROUND

Field

This disclosure relates generally to unbinding apparatus, methods, and systems. Particular aspects are intended for use with trucks, such as logging trucks and similar vehicles.

Description of Related Art

Various types of vehicles may be used to transport stacked loads of elongated objects. For example, logging trucks are commonly used throughout Canada and United States to deliver loads of wood logs from a harvesting site to a processing site, such as a pulp and paper mill. The wood logs may be cut a specific length (e.g., such as 8' to 10') and/or different lengths (e.g., up to 30'). Each load of wood logs may be secured to a logging truck with binders that limit movements of the logs during transit. Upon arrival at the processing site, the truck may proceed to a weigh station for scaling in, then to an unbinding station for removal of the binders, and then to an unloading area for removal of the wood logs with a crane. Some of the wood logs may roll away from the load and/or off the truck during removal of the binders, particularly if the stacked load is above the truck's loading standards. The rolling logs may injure the driver, disrupting normal operations at the processing site.

SUMMARY OF THE INVENTION

Aspects of unbinding apparatus, methods, and systems are disclosed.

One aspect disclosed herein is an apparatus for unbinding a stacked load of logs. For example, the apparatus may comprise a plurality of support arms movable toward a plurality of side surfaces of the stacked load. Each support arm of the plurality of support arms may comprise a guide surface and be: adjustable to abut against one or more side surfaces of the plurality of side surfaces; and independently movable relative to the plurality of support arms in one or more directions responsive to a physical shape of the one or more side surfaces to establish a formfitting abutment between the plurality of support arms and the plurality of side surfaces. Once the formfitting abutment is established, the guide surfaces of the plurality of support arms may be positioned and operative to guide a log released from the stacked load along an escape path over and away from an unbinding area adjacent the stacked load.

The plurality of support arms may be extendable, rotatable, and/or slidable toward the plurality of side surfaces. Each support arm of the plurality of support arms may comprise a forward segment abuttable against the physical shape and a rearward segment operable to move the forward segment toward the physical shape. For each support arm of the plurality of support arms, the forward segment may be independently moveable relative to the rearward segment in the one or more directions. The one or more directions may comprise one of a longitudinal movement direction relative to the stacked load and a vertical movement direction relative to the stacked load.

Each support arm of the plurality of support arms may be movable toward the one or more side surfaces in an undeflected configuration where the forward segment is aligned with the rearward segment along a support arm axis. For each support arm of the plurality of support arms, the forward segment may be independently movable relative to the rearward segment in the one or more directions into a deflected configuration where the forward segment is not aligned with the support arm axis. For each support arm of the plurality of support arms, the rearward segment and the forward segment may be rotatable toward the one or more side surfaces about a rotational axis. The forward segment may be independently movable relative to the rearward segment in one or both of a first direction generally parallel with the rotational axis and a second direction generally perpendicular to the rotational axis. The rearward segment and the forward segment may be rotatable relative to a base structure, the rearward segment may comprise stop surfaces, and the rearward segment may be rotatable about the rotational axis until one of the stop surfaces contacts a reaction shape of the base structure.

Each support arm of the plurality of support arms may comprise one or more joints permitting independent movements of the forward segment relative to the rearward segment in the one or more directions. For each support arm of the plurality of support arms, the one or more joints may comprise a first joint adapted to permit rotational movements of the forward segment along a first motion path and a second joint adapted to permit rotational movements of the forward segment along a second motion path that intersects the first motion path. The first joint may be located on the rearward segment. The forward segment may comprise a link segment extending between the first joint and the second joint, and a contact segment extending outwardly from the second joint. The link segment and the contact segment may be aligned when the forward segment and the rearward segment are in the undeflected configuration. The contact segment may be movable relative to the link segment and the rearward segment. The link segment and the contact segment may be independently rotatable relative to the rearward segment with the first joint. The contact segment may be independently rotatable relative to the link segment with the second joint.

A group of the plurality of support arms may be rotatable together toward a group of the plurality of side surfaces. The group of the plurality of support arms may be rotatable toward the group of the plurality of side surfaces by causing a support bar to rotate about a rotational axis in a first rotational direction, and away from the plurality of side surfaces by causing the support bar to rotate about the rotational axis in a second rotational direction opposite of the first rotational direction. The support bar may be rotatable in the first rotational direction responsive to a gravity force applied to the support bar and the second rotational direction responsive to a torque applied to the support bar. The support bar may be rotatable in the first rotational direction by unwinding a cable with a drive unit and the second rotational direction by winding the cable with the drive unit.

The apparatus may comprise one or more resilient elements adapted to control movements of the plurality of support arms relative to the plurality of side surfaces. Each support arm of the plurality of support arms may comprise a first resilient element adapted to control movements of the forward segment in a generally vertical direction of the one or more directions and a second resilient element adapted to control movements of the forward segment in a first generally longitudinal direction of the one or more directions. Each support arm of the plurality of support arms may comprise a third resilient element adapted to control movements of the forward segment in a second generally longitudinal direction of the one or more directions that is opposite of the first generally longitudinal direction. For each support arm of the plurality of support arms, the second and third resilient elements may be operable to maintain a longitudinal position of the support arm relative to the plurality of support arms absent external forces applied to the forward segment.

The apparatus may comprise any one or more of: an input device operable with a controller to cause the plurality of support arms to rotate toward the plurality of side surfaces; the controller; at least one sensor operable with the controller to determine when the formfitting abutment has been established; and/or a signalling device operable with the controller to output an audiovisual signal indicating when the formfitting abutment has been established. A mesh may span between two or more support arms of the plurality of support arms. Each support arm of the plurality of support arms may comprise a shoe with a contact plate sized to contact the one or more side surfaces. The contact plate may comprise a generally vertical length sized to span across multiple logs in the stacked load. The stacked load may be contained between a row of side rails and the contact plate may comprise a generally longitudinal length sized to span between two adjacent side rails in the row of side rails. Each shoe may be rotatably attached to at least one support arm of the plurality of support arms so that the contact plate may rotate relative to the at least one support arm to remain generally aligned with the one or more side surfaces when the plurality of support arms move toward the plurality of side surfaces.

The plurality of support arms may be slidable toward the plurality of side surfaces. Each support arm of the plurality of support arms may be attached to a slide body and slideable toward the plurality of side surfaces with the slide body. A portion of each support arm of the plurality of support arms may be retractable into an interior cavity of a base structure when the support arm is slid away from the plurality of side surfaces and extendable from the interior cavity when the support arm is slid toward the plurality of side surfaces. The apparatus may comprise a mesh that spans between two or more support arms of the plurality of support arms, contracts when the portions of the two or more support arms are retracted into their interior cavities, and expands when the portions of the two or more support arms are extended out of their interior cavities. Each support arm of the plurality of support arms may comprise a forward segment abuttable against the physical shape and a rearward segment operable to move the forward segment toward the physical shape. For each support arm of the plurality of support arms, the forward segment may be independently moveable relative to the rearward segment in the one or more directions when the portion of the support arm is extended out of the interior cavity. For each support arm of the plurality of support arms, the forward segment may be attached to the rearward segment by a resilient element that deflects to permit movements of the forward segment away from the physical feature and expands to press the forward segment into the one or more side surfaces.

Each support arm of the plurality of support arms may be independently movable relative to each other support arm of the plurality of support arms. Each support arm of the plurality of support arms may comprise a forward segment abuttable against the physical shape; and a rearward segment that is fixedly attached to the forward segment, movably attached to a base structure, and independently movable relative to each other support arm and the base structure to move the forward segment toward the physical shape in the one or more directions. Each support arm of the plurality of support arms may comprise a resilient element adapted to bias the forward segment toward the physical shape.

Another aspect disclosed herein is a system for unbinding a stacked load of logs. The system may comprise at least one apparatus for unbinding the stacked load. For example, each apparatus in the system may comprise a plurality of support arms movable toward a plurality of side surfaces of the stacked load. Each support arm of the plurality of support arms may comprise a guide surface and be: adjustable to abut against one or more side surfaces of the plurality of side surfaces; and independently movable relative to the plurality of support arms in one or more directions responsive to a physical shape of the one or more side surfaces to establish a formfitting abutment between the plurality of support arms and the plurality of side surfaces. Once the formfitting abutment is established, the guide surfaces of the plurality of support arms may be positioned and operative to guide a log released from the stacked load along an escape path over and away from an unbinding area adjacent the stacked load.

The system may comprise a base structure adapted to position the at least one apparatus relative to the unbinding area. The base structure may comprise an additional guide surface and define a covered operating area adjacent the unbinding area. Once the formfitting abutment is established, the additional guide surface of the base structure may be positioned and operative to guide the log released from the stacked load along a second escape path over and away from the covered operating area. The base structure may comprise a mesh adapted to contain the log after being guided along the second escape path. The system may comprise a retaining structure adapted to contain the log after being guided along the second escape path.

The system may comprise a plurality of drive units operable to move the plurality of support arms toward the plurality of side surfaces. The system may comprise an input device operable to activate the plurality of drive elements. The input device may comprise a user interface that is physically located and/or only operable within the covered operating area of the base structure. The system may comprise a controller operable with the input device to cause the plurality of drive elements to move the plurality of support arms. The system may comprise a signalling device operable with the controller to output audiovisual signals indicating whether formfitting abutment is established. The system may comprise one or more sensors adapted to output measurement data to the controller for determining whether formfitting abutment is established. The one or more sensors may comprise one of a force sensor associated with the plurality of drive elements, a visual sensor oriented toward the unbinding area, and a pressure sensor located on one or more of the support arms. The controller may be adapted to identify an operator of the system based on data output from the one or more sensors. One or both of the input device and the controller may comprise an application operable with a mobile computing device (e.g., a smart phone) to cause movements of the plurality of support arms when the mobile computing device is not located in the unbinding area.

Another aspect described herein is a system for unbinding a stacked load of logs. The system may comprise a first apparatus for unbinding the stacked load. For example, the first apparatus may be located on a first side of the stacked load and comprise a plurality of first support arms movable toward a plurality of first side surfaces on the first side of the stacked load, each first support arm of the plurality of first support arms comprising a first guide surface and being: adjustable to abut against one or more first side surfaces of the plurality of first side surfaces; and independently movable relative to the plurality of first support arms in one or more directions responsive to a first physical shape of the one or more first side surfaces to establish a first formfitting abutment between the plurality of first support arms and the plurality of first side surfaces. The system may comprise a second apparatus for unbinding the stacked load. For example, the second apparatus may be located on a second side of the stacked load and comprise a plurality of second support arms movable toward a plurality of second side surfaces on the second side of the stacked load, each second support arm of the plurality of second support arms comprising a second guide surface and being: adjustable to abut against one or more second side surfaces of the plurality of second side surfaces; and independently movable relative to the plurality of second support arms in one or more directions responsive to a second physical shape of the one or more second side surfaces to establish a second formfitting abutment between the plurality of second support arms and the plurality of second side surfaces. Once the first and second formfitting abutments are established, the first and second guide surfaces of the respective pluralities of first and second support arms may be positioned and operative to guide a log released from the stacked load along either of a first escape path over and away from a first unbinding area adjacent the first side of the stacked load or a second escape path over and away from a second unbinding area adjacent the second side of the stacked load.

The system may comprise a first base structure adapted to position the first apparatus relative to the first unbinding area, define a first covered operating area adjacent the first unbinding area, and guide the log released from the stacked load along a first additional escape path over and away from the first covered operating area once the first formfitting abutment is established; and a second base structure adapted to position the second apparatus relative to the second unbinding area, define a second covered operating area adjacent the second unbinding area, and guide the log released from the stacked load along a second additional escape path over and away from the covered operating area once the first formfitting abutment is established. The system may comprise a plurality of first drive units operable to move the plurality of first support arms and the plurality of second support arms. The system may comprise at least one of an input device and a controller operable to activate one or more drive units of the plurality of drive units. Each first support arm of the plurality of first support arms may comprise a first forward segment abuttable against the first physical shape and a first rearward segment operable to move the first forward segment; and each second support arm of the plurality of second support arms may comprise a second forward segment abuttable against the second physical shape and a second rearward segment operable to move the second forward segment. Each first support arm of the plurality of first support arms may be independently movable relative to each other first support arm of the plurality of first support arms; and each second support arm of the plurality of second support arms may be independently movable relative to each other second support arm of the plurality of second support arms.

Another aspect described herein is a method for unbinding a stacked load of logs. For example, the method may comprise: moving a plurality of support arms toward a plurality of side surfaces of the stacked load; and, for each support arm of the plurality of support arms: adjusting the support arm to abut against one or more side surfaces of the plurality of side surfaces; and independently moving the support arm relative to the plurality of support arms in one or more directions responsive to a physical shape of the one or more side surfaces to establish a formfitting abutment between the plurality of support arms and the plurality of side surfaces. Once the formfitting abutment is established, guide surfaces of the plurality of support arms may be positioned and operative to guide a log released from the stacked load along an escape path over and away from an unbinding area adjacent the stacked load.

Moving the plurality of support arms toward the plurality of side surfaces of the elongated objects may comprise extending, rotating, and/or sliding each support arm of the plurality of support arms. Independently moving each support arm of the plurality of support arms may comprise moving a forward segment of each support arm relative to a rearward segment of the support arm in the one or more directions. The method may comprise receiving, with a controller, input data from an input device; and causing, with the controller, a drive element to move the plurality of support arms responsive to the input data. The method also may comprise receiving, with the controller, measurement data from one or more sensors; and determining, with the controller, whether the formfitting abutment has been established based on the measurement data.

Related apparatus, methods, and systems also are disclosed, each possible combination and variation thereof being part of this disclosure.

BRIEF DESCRIPTION OF THE DRAWINGS

The accompanying drawings, which are incorporated in and constitute part of this disclosure, illustrate exemplary aspects that, together with the written descriptions, serve to explain the principles of this disclosure. Numerous aspects are shown conceptually in the drawings and particularly described, pointed out, and taught in the written descriptions. Some structural and operational aspects may be better understood by referencing the written portions together with the accompanying drawings, of which.

DETAILED DESCRIPTION

Figure 1:
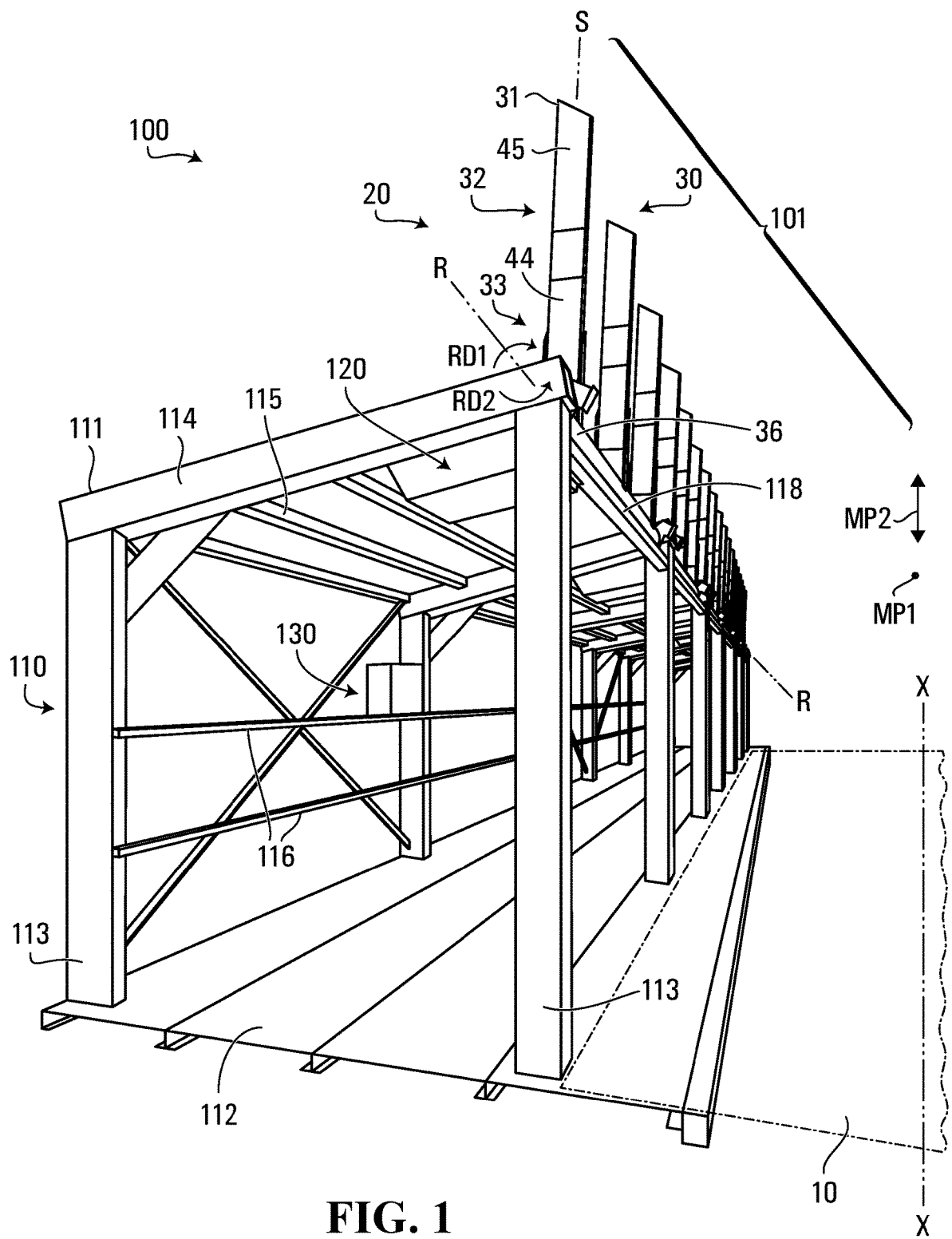
FIG. 1 depicts a side view of an exemplary unbinding apparatus and system comprising a plurality of support arms movable toward a plurality of side surfaces of a stacked load.

Aspects of the present disclosure are not limited to the exemplary structural details and component arrangements described in this description and shown in the accompanying drawings. Many aspects of this disclosure may be applicable to other aspects and/or capable of being practiced or carried out in various variants of use, including the examples described herein.

Throughout the written descriptions, specific details are set forth to provide a more thorough understanding to persons of ordinary skill in the art. For convenience and ease of description, some well-known elements may be described conceptually to avoid unnecessarily obscuring the focus of this disclosure. In this regard, the written descriptions and accompanying drawings should be interpreted as illustrative rather than restrictive, enabling rather than limiting.

Exemplary aspects of this disclosure reference various apparatus, methods, and systems. Some aspects are described with reference to particular elements (e.g., a support arm) utilizing particular mechanisms (e.g., a drive element) to perform particular functions (e.g., moving the support arm) relative to a particular elongated object (e.g., such as log). Unless claimed, these descriptions are provided for convenience and not intended to limit this disclosure. Accordingly, any aspects described in this disclosure with reference to these particular examples may be similarly utilized with any comparable apparatus, methods, and systems operable with any type of elongated objects, including logs and any other similarly shaped objects.

Several exemplary reference axes are described, including a rotational axis R-R, a longitudinal axis X-X, a vertical axis Z-Z, a pivot axis P-P, and a support arm axis S-S. Some elements and/or movements thereof are described relative to these axes, such as a first movement path MP1, a second movement path MP2, and/or a third movement path MP3. For example, longitudinal axis X-X and vertical axis Z-Z may define a plane, and various elements may be rotatable about rotational axis R-R in directions toward and away from the plane. As a further example, some objects may be described as "elongated," meaning that they have a length greater than a width along a reference axis. Rotational axis R-R may be parallel with longitudinal axis X-X and non-parallel with vertical axis Z-Z, meaning that axis X-X may extend across and/or intersect axis Z-Z. Additional movements and forces are similarly described. These relative terms are provided for convenience and do not limit this disclosure unless claimed.

Inclusive terms such as "comprises," "comprising," "includes," "including," and variations thereof, are intended to cover a non-exclusive inclusion, such that any described apparatus, method, system, or element thereof comprising a list of elements does not include only those elements, but may include other elements not expressly listed and/or inherent thereto. Unless stated otherwise, the term "exemplary" is used in the sense of "example," rather than "ideal." Various terms of approximation may be used, including "approximately" and "generally." Approximately means "roughly" or within 10% of a stated number or outcome and generally means "usually" or more than a 50% probability.

Terms such as "attached to," "attachable to," and "attaching" are intended to generically describe a structural connection between two or more elements. Some structural connections may be "fixedly attached" and thus non-rotatable, as when the two or more elements are formed together and cannot be rotated independently without damage. Other structural connections may be "movably attached," as when the two or more elements are coupled together by attachment elements adapted to permit relative movements of those elements (e.g., rotating, sliding, telescoping). Unless stated otherwise, the generic term "attach" and its equivalents may comprise any such variations.

Aspects of any exemplary controller are described. Functional terms such as "processing," "computing," "calculating," "determining," "displaying," and the like, may refer to actions and processes performable the controller, which may comprise any type of software and/or hardware. The software may comprise program objects (e.g., lines of codes) executable to perform various functions. Each program object may comprise a sequence of operations leading to a desired result, such as an algorithm. The operations may require or involve physical manipulations of physical quantities, such as electrical or magnetic signals capable of being stored, transferred, combined, compared, and otherwise manipulated. The signals may be described conceptually as bits, characters, elements, numbers, symbols, terms, values, or the like.

The hardware may comprise any known computing and/or networking devices that are specially or generally adapted to execute the program objects, perform the operations, and/or send or receive the signals. Any known hardware devices may be described conceptually. For example, the hardware may comprise a processing unit adapted to execute the project objects by manipulating and/or transforming input data represented as physical (electronic) quantities within the unit's registers and memories into output data similarly represented as physical quantities within the unit's memories or registers and/or other data storage, transmission, or display devices. The processing unit may comprise any number of processor(s) and/or processing element(s), including any singular or plural computing resources disposed local to or remote from one another.

The hardware may comprise any known technologies for storing the program objects and any data associated therewith. For example, the program objects may be stored in any machine (e.g. computer) readable storage medium in communication with the processing unit, including any mechanism for storing or transmitting data and information in a form readable by a machine (e.g., a computer). Exemplary storage mediums may comprise: read only memory ("ROM"); random access memory ("RAM"); erasable programmable ROMs ("EPROMs"); electrically erasable programmable ROMs ("EEPROMs"); magnetic or optical cards or disks; flash memory devices; and/or any electrical, optical, acoustical or other form of propagated signals (e.g., carrier waves, infrared signals, digital signals, etc.).

Some aspects are described with reference to methods, some steps of which may be performable with the controller. Although not required, some methods are described with reference to a conceptual drawing to help orient the reader, such as a flowchart with boxes interconnected by arrows. The boxes may be combined, interconnected, and/or interchangeable to provide options for additional modifications according to this disclosure. The arrows may define an exemplary sequence of operation, the order of which may be important. For example, a particular order of method steps may describe a sequence of operation that is performable by the controller to realize specific processing benefits, such as improving a computational performance and/or an operational efficiency.

Aspects of this disclosure are now described with reference to exemplary unbinding apparatus 20. As shown in FIGS. 1 and/or 2, for example, unbinding apparatus 20 may comprise a plurality of support arms 30 that are located proximate to an unbinding area 10 and movable toward a stacked load 2 of logs 3 positioned in on a truck 5 parked in unbinding area 10. Truck 5 may be positioned in unbinding area 10 so that a longitudinal axis of truck 5 is aligned with a longitudinal axis X-X of unbinding area 10. Each support arm 30 may be movable toward a plurality of side surfaces 4 of stacked load 2 until it makes physical contact with one or more side surfaces of plurality of side surfaces 4, which may include any side surfaces of one or more logs 3 in stacked load 2. Each support arm 30 may be adjustable to abut against the one or more side surfaces of plurality of side surfaces 4 and independently movable responsive to a physical shape of plurality of side surfaces 4 to establish a formfitting abutment between plurality of support arms 30 and plurality of side surfaces 4. For logs 3, the physical shape be caused by bark distortions, branch stumps, knots, stack placement, and/or other surface defects tending to make the one or more side surfaces uneven.

Figure 2:
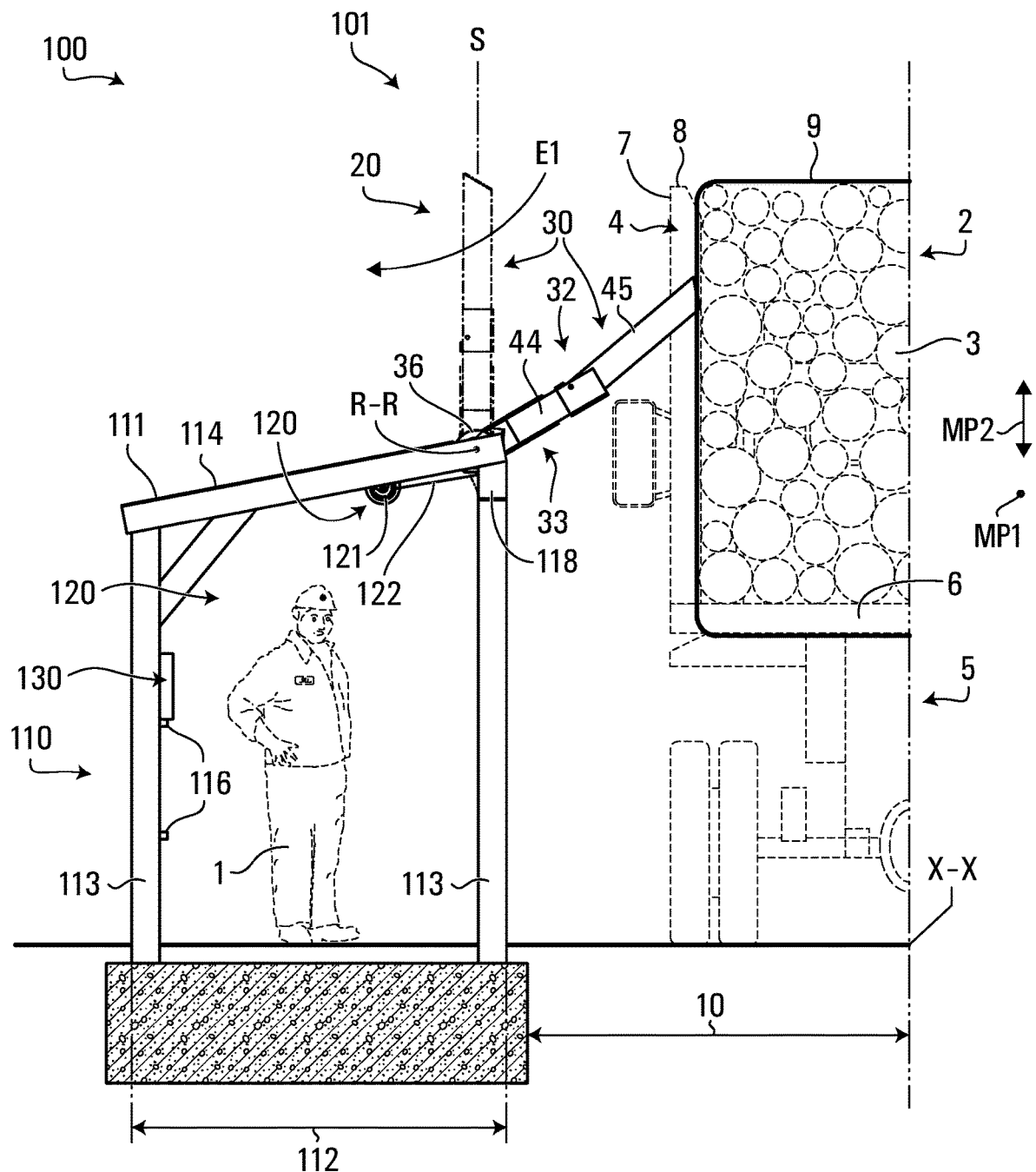
FIG. 2 depicts a cross-sectional view of the FIG. 1 apparatus and system.

As shown in FIGS. 1 and 2, for example, each support arm 30 may be independently moveable in one or more directions relative to plurality of support arms 30 and a base structure (e.g., such as base structure 110 described below) responsive to the physical shapes of logs 3. In this example, unbinding apparatus 20 may comprise different groups of support arms 30 that are movable together toward plurality of side surfaces 4. Groups of three support arms 30 are shown in FIG. 1, for example, although any number of arms 30 may be included in each group without departing from this disclosure.

As shown in FIG. 2, for example, logs 3 may be stacked on a bed 6 of truck 5 at a loading facility so that at least a lower portion of stacked load 2 is contained between opposing side rails 7 of bed 6. Truck 5 may be driven from the loading facility to an unloading facility having unbinding area 10 and at least one apparatus 20 proximate thereto. Truck 5 may then be parked in unbinding area 10 so that stacked load 2 is adjacent unbinding apparatus 20, such as when the longitudinal axis of the truck is aligned with longitudinal axis X-X of unbinding area 10. As shown in FIG. 2, for example, binders 9 (e.g., steel chains) may be attached to (e.g., wrapped around) stacked load 2 and bed 6 at the loading facility to limit movements of logs 3 during transit. An operator 1 of unbinding apparatus 20 may need to remove (e.g., unwrap) binders 9 from stacked load 2 and bed 6 after truck 5 is parked in unbinding area 10. Binders 9 may comprise chains and related attachment devices on one or both sides of truck 5 that need to mechanically de-coupled by operator 1 in unbinding area 10 before stacked load 2 can be unloaded.

It is a known problem that one or more logs 3 may be inadvertently be released from stacked load 2 after binders 9 are removed, particularly if some logs 3 were: stacked above top surfaces 8 of side rails 7 at the loading facility to maximize load 2; have shifted during transit from the loading facility to the unloading facility; and/or have lengths allowing them to pop out from between side rails 7 when the compressive forces previously applied by binders 9 are released. It likewise known that operator 1 may be injured by any logs 3 released from stacked load 2 absent protections. As shown in FIG. 2, for example, each wood log may weigh 2,000 lbs (1,000 kg) or more, depending upon its size, wood type, and moisture content, creating an appreciable risk of injury to operator 1 if not handled properly. To minimize the risk of injury, support arms 30 may be movable toward plurality of side surfaces 4 of stacked load 2 to protect operator 1 from logs 3 released from stacked load 2 when operator 1 is working in unbinding area 10 to remove binders 9. Different means for moving support arms 30 are described in this disclosure, including rotating, sliding, telescoping, and combinations thereof, each of which may be covered by generic claim terms such as "movable" and "moving."

Each support arm 30 may be independently movable in one or more different directions relative to the base structure to accommodate the physical shape of the one or more side surfaces of plurality of side surfaces 4. As shown in FIGS. 1 and 2, for example, all or at least a forward segment of each support arm 30 may be independently movable responsive to the physical shape of the one or more side surfaces of plurality of side surfaces 4. The physical shape may comprise side rails 7, depending upon their location relative to arms 30. The independent movements of each support arm 30 may allow unbinding apparatus 20 to establish and maintain a formfitting abutment between plurality of support arms 30 and plurality of side surfaces 4 of stacked load 2 even if plurality of side surfaces 4 are generally uneven in multiple directions because of their physical shapes, the configuration and position of side rails 7, and/or the position of truck 5 in unbinding area 10 (e.g., when a longitudinal axis of truck 5 is not aligned with longitudinal axis X-X of area 10). As shown in FIG. 1, for example, upper portions of plurality of support arms 30 may define guide surfaces 31 that are spaced apart and/or sloped to cause any released logs 3 to roll over and away from unbinding area 10 and operator 1 along an escape path E after establishing the formfitting abutment.

By way of example, the formfitting abutment may be established by an unbinding method comprising: (i) moving support arms 30 relative to the support structure until contact surfaces of support arms 30 make physical contact with one or more side surfaces of plurality of side surfaces 4; and (ii) independently moving all or at least a forward segment of each support arm 30 relative to the support structure so that the contact surfaces more closely conform to the physical shapes of plurality of side surfaces 4, resulting in a contact profile of support arms 30 along longitudinal axis X-X that is visibly molded into an irregular shape defined by the physical shapes of plurality of side surfaces 4. As a further example, the formfitting abutment may be objectively determined (e.g., by sensors) when the contact surfaces of all or a substantial majority of plurality of support arms 30 (e.g., at least 75% or more) are pressed against plurality of side surfaces 4 with a minimum force sufficient to minimize gaps between the contact surfaces and plurality of side surfaces 4 and/or prevent gaps of a certain size (e.g., 1 inch or more) from forming therebetween.

Figure 3:
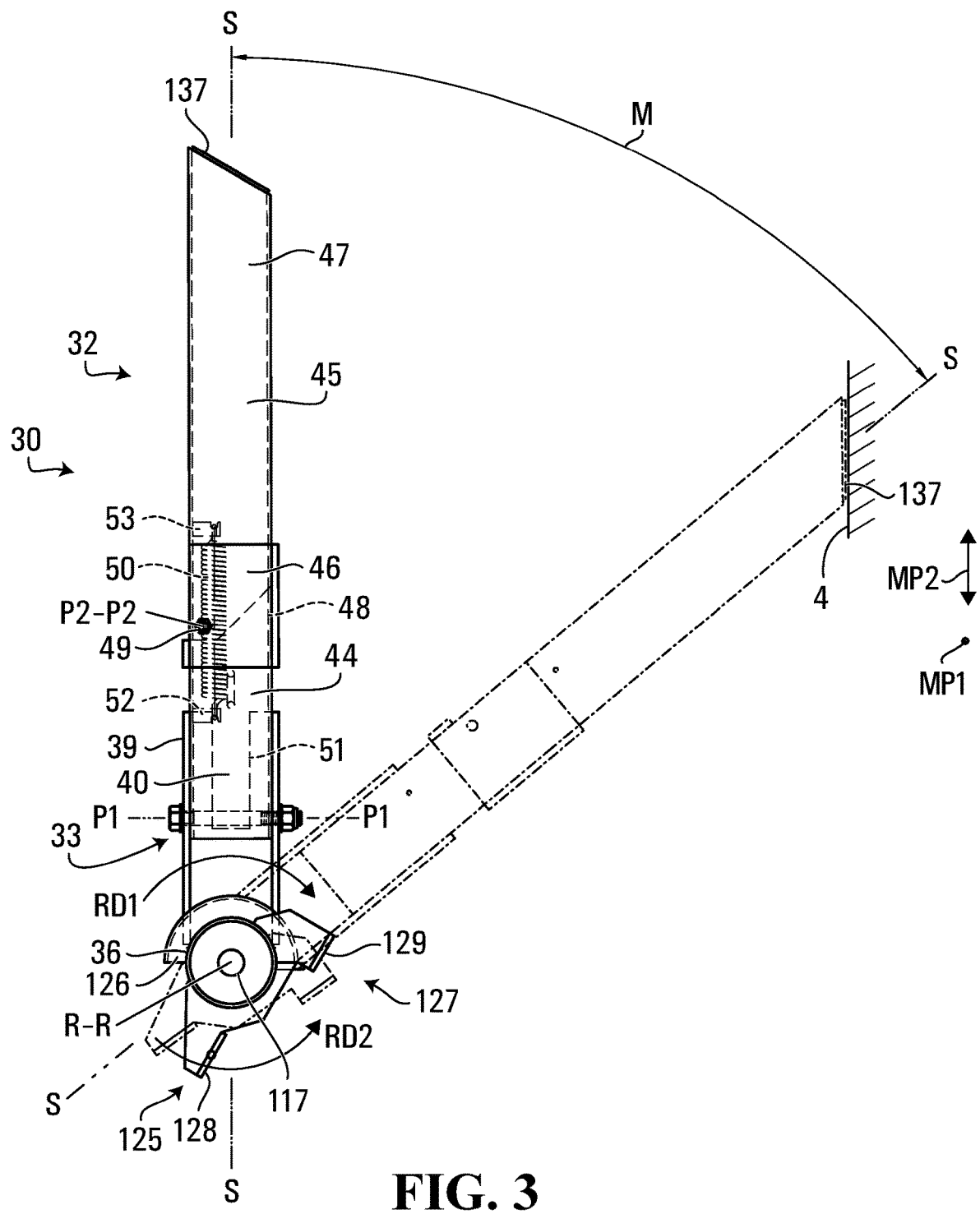
FIG. 3 depicts a side view of an exemplary support arm of the plurality of support arms.
Figure 4:
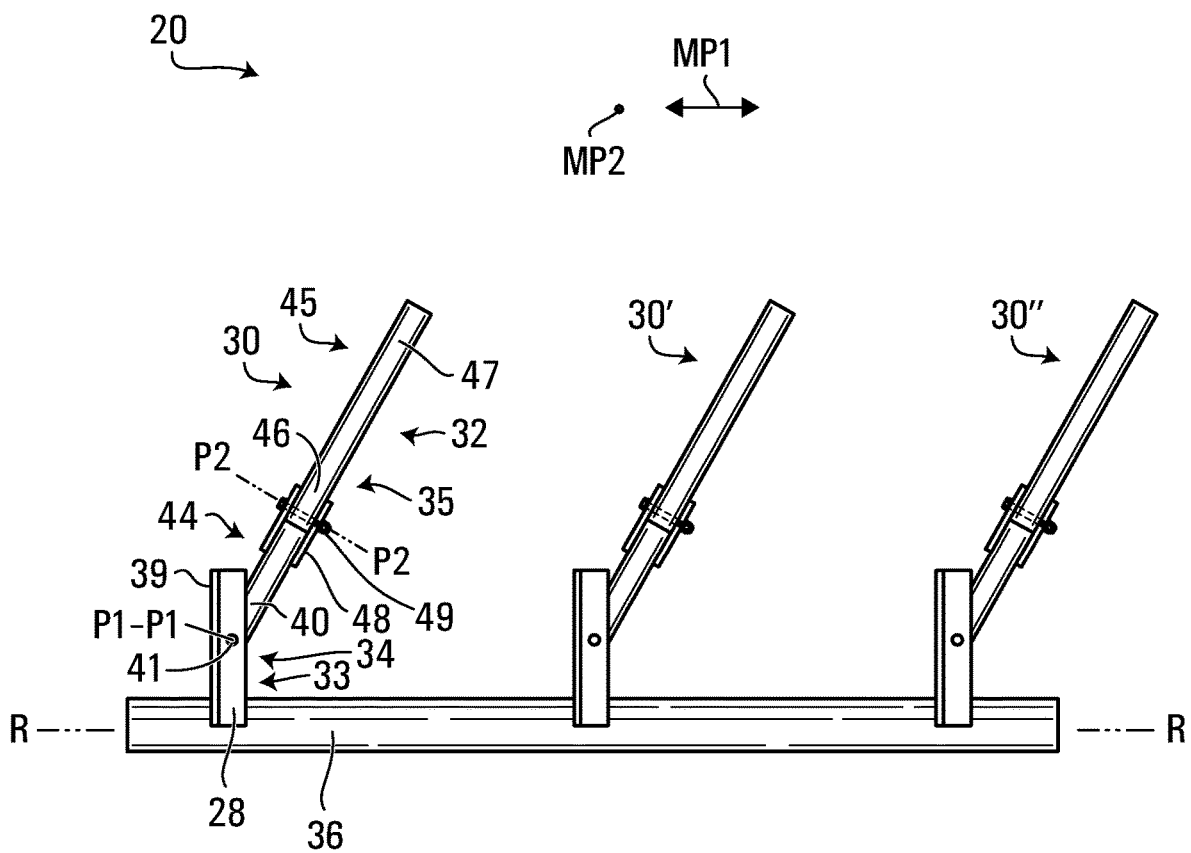
FIG. 4 depicts a top down view of an exemplary group of the plurality of support arms.
Figure 5:
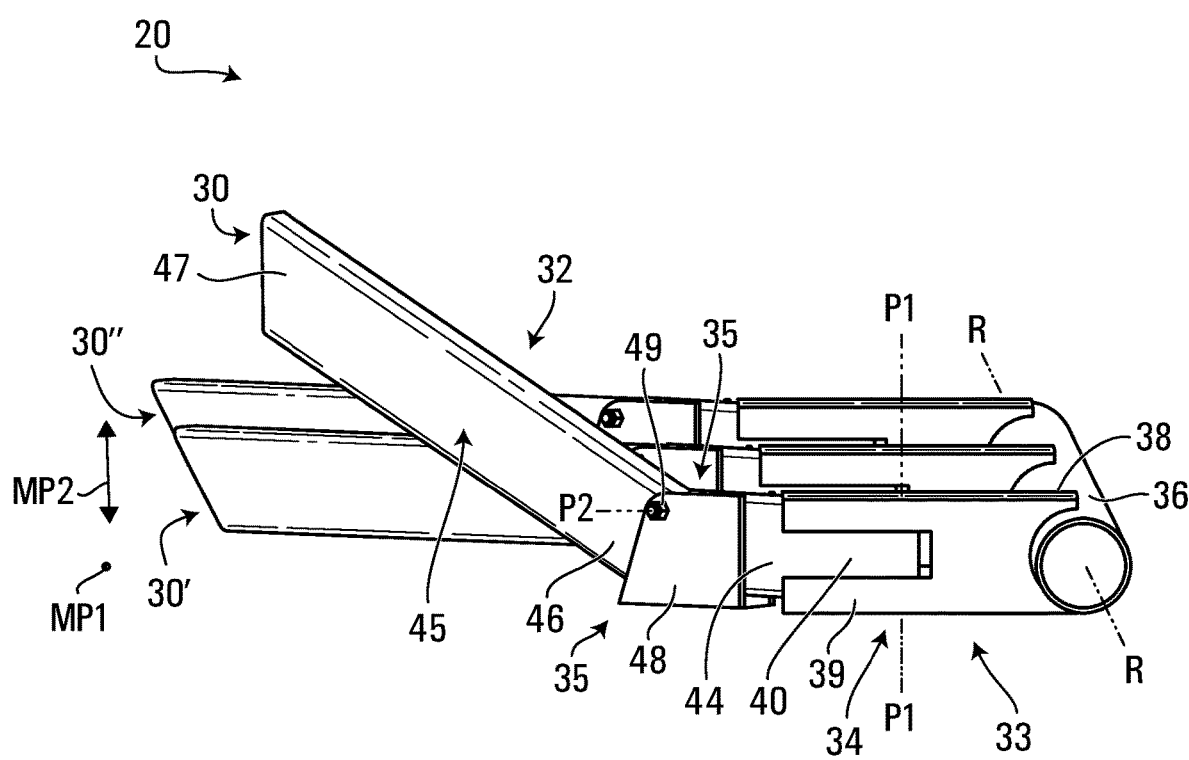
FIG. 5 depicts a side view of the FIG. 4 group of support arms.

As shown in FIG. 3, for example, support arm 30 may comprise a forward segment 32 and a rearward segment 33. Forward segment 32 may be independently moveable in one or more directions relative to rearward segment 33 responsive to the physical shape of the one or more side surfaces of plurality of side surfaces 4 to establish the formfitting abutment. The one or more directions may comprise at least two degrees of freedom. For example, a first degree of freedom is shown in FIG. 4 as a first movement path MP1 oriented relative to longitudinal axis X-X and a second degree of freedom is shown in FIG. 5 as a second movement path MP2 oriented relative to vertical axis Z-Z. Each forward segment 32 of attached to may be independently moveable in the one or more directions (e.g., along one or both of the two degrees of freedom) responsive to the physical shape of the one or more side surfaces of plurality of side surfaces 4 so that the formfitting abutment more closely corresponds with the uneven nature of plurality of side surfaces 4. Any number of support arms 30 may be similarly configured. For example, only a portion of forward segments 32 may be independently moveable to modify the formfitting abutment for use with specific types of side surfaces 4 and/or side rails 7.

Put another way, unbinding apparatus 20 may comprise: a plurality of support arms 30 movable toward plurality of side surfaces 4, each support arm 30 being independently movable relative to at least one other support arm 30 in one or more directions responsive to the physical shape of the one or more side surfaces of plurality of side surfaces 4 to establish a formfitting abutment between plurality of support arms 30 and plurality of side surfaces 4, wherein at least one support arm 30 comprises a forward segment 32 and a rearward segment 33, forward segment 32 being independently movable relative to rearward segment 33 in the one or more directions responsive to the physical shape of the one or more side surfaces of plurality of side surfaces 4. Different types of movement are contemplated.

As shown in FIG. 3, for example, each support arm 30 may be independently rotatable toward side surface 4 about a rotational axis R-R in a first rotational direction RD1 and independently rotatable away from plurality of side surfaces 4 in a second rotational direction RD2. As shown in FIG. 2, for example, rotational axis R-R may be generally parallel with longitudinal axis X-X of unbinding area 10. Each forward segment 32 may be rotatable together with its rearward segment 33 in first rotational direction RD1 toward plurality of side surfaces 4 and in second rotational direction RD2 away from plurality of side surfaces 4. As shown in FIG. 3, for example, forward segments 32 and rearward segments 33 may be rotatable together about rotational axis R-R in an undeflected configuration, in which forward segment 32 and rearward segment 33 are aligned with a support arm axis S-S. First movement path MP1 and second movement path MP2 may be described relative to rotational axis R-R. As shown in FIG. 4, for example, first movement path MP1 may extend in a longitudinal direction generally parallel with rotational axis R-R, such that forces applied along first movement path MP1 may cause longitudinal movements of forward segments 32 along axes X-X and R-R. As shown in FIG. 5, for example, second movement path MP2 may extend in a vertical direction generally perpendicular with rotational axis R-R, such that forces applied along second movement path MP2 may cause vertical movements of forward segments 33 along a vertical axis Z-Z.

As shown in FIG. 3, for example, support arm 30 may comprise one or more joints operable to move forward segment 32 independently relative to rearward segment 33 in one or more directions along first movement path MP1 and/or second movement path MP2. Any style or combination of joints may be used with each support arm 30 to permit independent movements of segment 32 relative to segment 33, including the examples described below and any single- or multi-axis hinge(s) that are similarly adapted to provide arm 30 with comparable mobility and/or flexibility. As shown in FIGS. 4 and 5, for example, the one or more joints of each support arm 30 may comprise a rearward joint 34 and/or a forward joint 35. Rearward joint 34 may comprise a first rotational surface for rotating forward segment 32 longitudinally relative to rearward segment 33 along first movement path MP1. Forward joint 35 may comprise a second rotational surface for rotating forward segment 32 vertically relative to rearward segment 33 along second movement path MP2. Together, because of the movements enabled by their respective first and second rotational surfaces, rearward joint 34 and forward joint 35 may permit independent movements of each forward segment 32 relative to its rearward segment 33 (e.g., in one or both of the two degrees of freedom). The first and second rotational surfaces may comprise linear rotational surfaces permitting rotational movements about a linear pivot axis such as axes P1-P1 and P2-P2 described below; and/or non-linear surfaces permitting movements about a plurality of pivot axes, such as any curved, semi-spherical, and/or spherical surfaces (e.g., as with a ball or globe joint).

As shown in FIGS. 4 and 5, for example, rearward segment 33 may comprise a structural shape (e.g., a steel channel) defining an attachment end 38 and a receiving end 39. Attachment end 38 may be fixedly attached (e.g., welded) to a movable portion of the support structure (e.g., such as support bar 36 described below). Receiving end 39 may comprise sidewalls (e.g., walls of the steel channel) adapted to permit movements of forward segment 32 relative to rearward segment 33 along first movement path MP1. As shown in FIGS. 3-6, for example, the sidewalls of receiving end 39 may define: an interior cavity sized to receive a pivot end 40 of each forward segment 32; a sidewall opening that allows pivot end 40 to rotate into and out of the interior cavity along first movement path MP1; and stop surfaces limiting a range of movement for pivot end 40.

Figure 6:
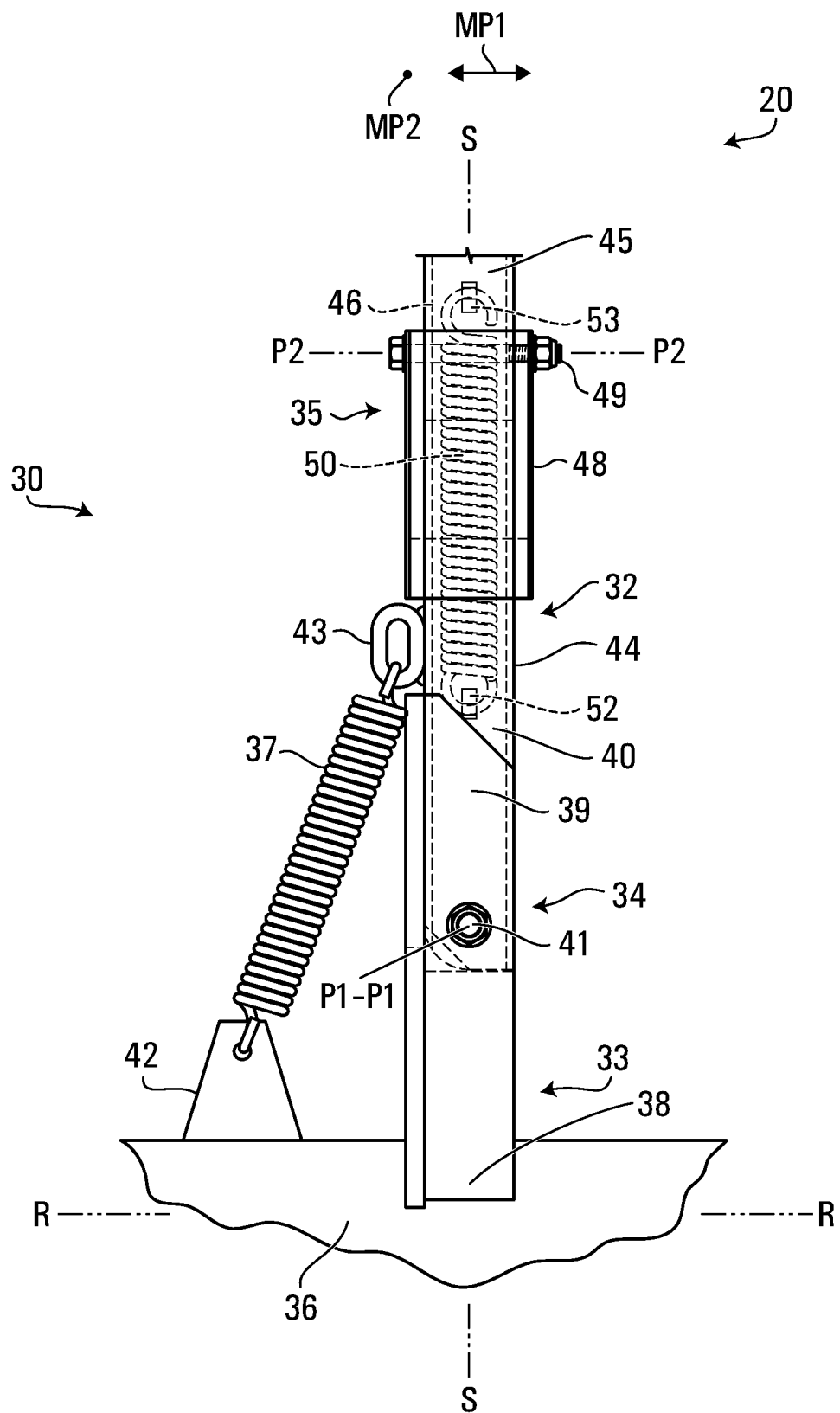
FIG. 6 depicts a top down view of an exemplary support arm of the plurality of support arms.
Figure 7:
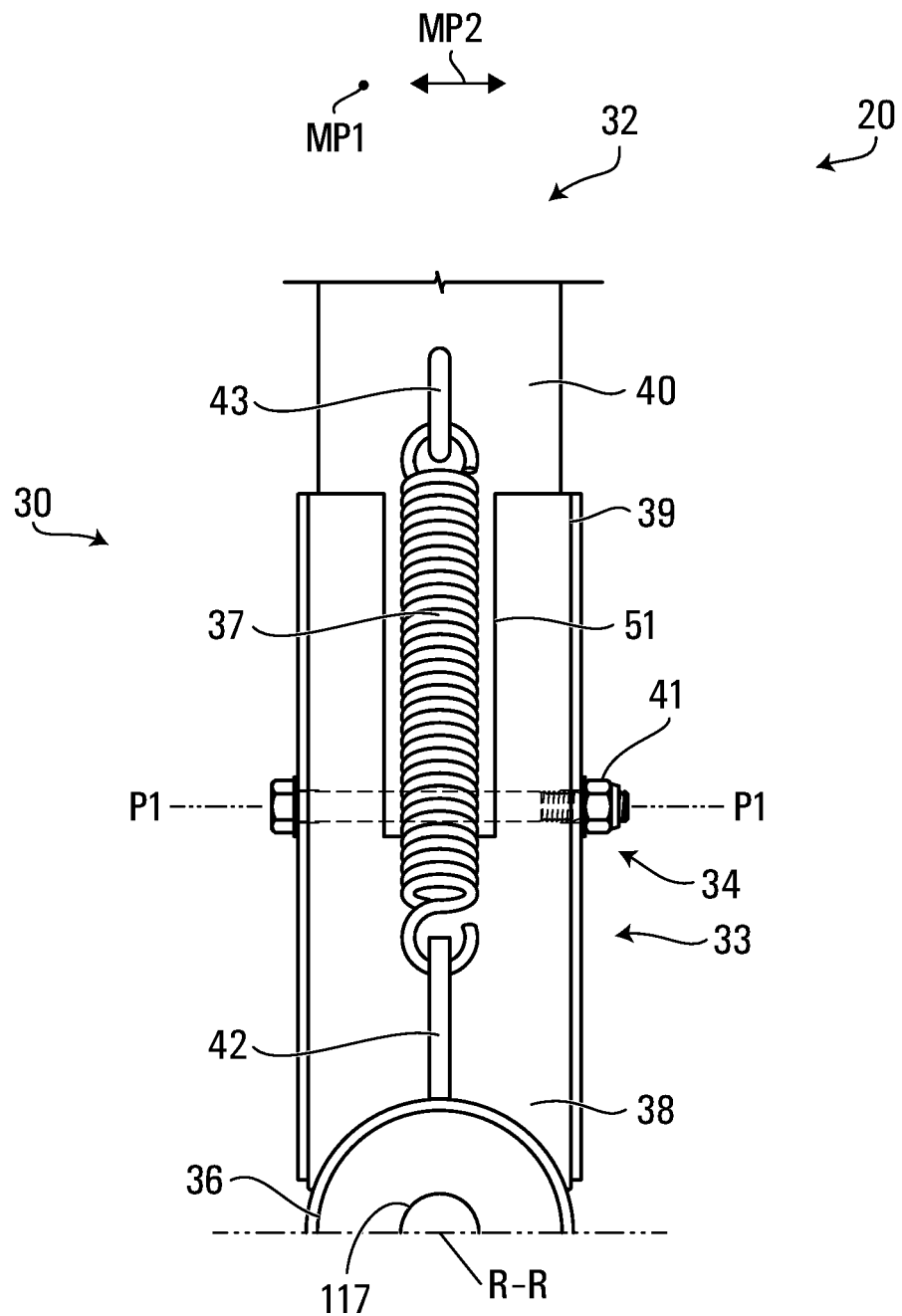
FIG. 7 depicts a side view of the FIG. 6 support arm.

As shown in FIGS. 6 and 7, for example, rearward joint 34 may comprise a pivot 41 (e.g., a steel pin) extending through the interior cavity of receiving end 39 between its stop surfaces along a first pivot axis P1-P1 that is generally parallel with second movement path MP2. Pivot 41 may be fixedly attached to receiving end 39. As shown in FIG. 7, for example, pivot 41 be inserted into openings extending through receiving end 39 and pivot end 40 along first pivot axis P1-P1 and then attached (e.g., bolted) to receiving end 39. Forward segment 32 may thus be rotatable relative to rearward segment 33 along first movement path MP1 when pivot end 40 rotates on pivot 41 about first pivot axis P1-P1 into and out of the interior cavity of receiving end 39 between its stop surfaces.

As shown in FIG. 6, for example, support arm 30 may comprise a first resilient element 37 (e.g., a steel spring, a spring steel bar, an elastic loop, etc.) operable to control movements of forward segment 32 longitudinally relative to rearward segment 33 along first movement path MP1. First resilient element 37 may comprise a spring (e.g., a steel coil spring) extending between an attachment 42 (e.g., a steel plate) on the movable portion of the base structure and an attachment 43 (e.g., a steel loop) on pivot end 40. The spring may apply a first biasing force to attachments 42 and 43 that maintains the undeflected configuration of support arm 30 absent external forces applied thereto. As shown in FIG. 6, for example, the first biasing force may cause exterior surfaces of pivot end 40 to be maintained against the stop surfaces of receiving end 39 so that forward segment 32 and rearward segment 33 remain generally aligned with support arm axis S-S.

As shown in FIG. 4, for example, forward segment 32 may move independently of rearward segment 33 along first movement path MP1 responsive to a first reaction force applied by plurality of side surfaces 4. As shown in FIG. 6, for example, each forward segment 32 may be movable in at least one direction along first movement path MP1 (e.g., to the right) whenever the first reaction force is greater that the first biasing force, causing first resilient element 37 to extend along its length. The extension of first resilient element 37 and the elastic forces associated therewith may: slow and thus help control movements of forward segment 32 along first movement path MP1 responsive to the first reaction force; and move forward segment 32 back into alignment with rearward segment 33 when the first reaction force is removed. As shown in FIG. 7, for example, first resilient element 37 may move toward receiving end 39 and pivot end 40 when extending along its length and the sidewalls of receiving end 39 may define a resilient element opening 51 that receives element 37 as it extends to avoid interference with receiving end 39.

As shown in FIGS. 1-6, for example, forward segment 32 may comprise a link segment 44 and a contact segment 45. Contact segment 45 may move with link segment 44 along first movement path MP1 in a longitudinal direction and relative to link segment 44 along second movement path MP2 in a vertical direction. Link segment 44 may comprise a structural shape (e.g., a steel tube) defining pivot end 40 and a receiving end 48. Contact segment 45 may comprise a structural shape (e.g., a steel tube) defining a pivot end 46 and a contact end 47. Like receiving end 39, receiving end 48 may comprise sidewalls (e.g., walls of the steel tube) adapted to permit movements of contact segment 45 relative to link segment 44 and rearward segment 33 along second movement path MP2. As shown in FIGS. 3-6, for example, the sidewalls of receiving end 48 may define: an interior cavity sized to receive pivot end 46; a sidewall opening that allows pivot end 46 to rotate into and out of the interior cavity along second movement path MP2; and stop surfaces that limit a range of movement for pivot end 46. As shown in FIG. 3, and described further below, a sensor may be attached to one or more contact ends 47.

As shown in FIGS. 4, 5, and/or 6, for example, forward joint 35 may comprise a pivot 49 (e.g., a steel pin) extending through the interior cavity of receiving end 48 between its stop surfaces along a second pivot axis P2-P2 that is generally parallel with first movement path MP1. Pivot 49 may be fixedly attached to receiving end 48. As shown in FIG. 6, for example, pivot 49 may be inserted into openings extending through receiving end 48 and pivot end 46 along second pivot axis P2-P2 and then attached (e.g., bolted) to receiving end 48. Contact segment 45 may thus be rotatable relative to link segment 44 along second movement path MP2 when pivot end 46 rotates on pivot 49 about axis P2-P2 into and out of the interior cavity of receiving end 48 between its stop surfaces.

As shown in FIG. 6, for example, support arm 30 may comprise a second resilient element 50 (e.g., a steel spring, a spring steel bar, an elastic loop, etc.) operable to control movements of forward segment 32 vertically relative to rearward segment 33 along second movement path MP2. Second resilient element 50 may comprise a spring (e.g., a steel coil spring) extending between an attachment 52 (e.g., a steel hook) on link segment 44 and an attachment 53 (e.g., a steel hook) on contact segment 45. The spring may apply a second biasing force to attachments 52 and 53 that maintains the undeflected configuration of support arms 30 absent external forces applied thereto. Contact segment 45 may move independently of link segment 44 along second movement path MP2 responsive to a second reaction force applied by plurality of side surfaces 4. As shown in FIG. 6, for example, contact segment 45 may be movable in at least one direction along second movement path MP2 (e.g., vertically) whenever the second reaction force is greater than the second biasing force, causes second resilient element 50 to extend along its length.

As shown in FIG. 6, for example, attachment 52 may be fixedly attached to interior surfaces of link segment 44 and attachment 53 may be fixedly attached to interior surfaces of contact segment 45 so that second resilient element 50 may be mounted inside segments 44 and 45. In this example, exterior surfaces of second resilient element 50 may act against interior surfaces of segments 44 and 45 to maintain the undeflected configuration of support arm 30; and second resilient element 50 may be surrounded by sidewalls of link segments 44 and 45 to prevent it from being damaged. For improved serviceability, attachments 52 and 53 may alternatively be fixedly attached to exterior surfaces of segments 44 and 45 so that resilient element 50 may be externally mounted to support arm 30.

Each group of support arms 30 may be rotatable together in first rotational direction RD1 and second rotational direction RD2 about rotational axis R-R. As shown in FIG. 2, for example, each group of support arms 30 may be attached to a support bar 36 that is rotatably attached to the base structure. Support bar 36 may be utilized to position each forward segment 32 at a desired height for contacting plurality of side surfaces 4, such as ten to twenty feet or more above the ground. Support bar 36 may comprise a structural shape (e.g., a steel tube) extending along rotational axis R-R. As shown in FIG. 3, for example, support bar 36 may comprise a circular cross-sectional shape with interior surfaces that are rotatable on an axle of the base structure, such as another steel tube having a circular diameter. As shown in FIG. 5, for example, each attachment end 38 may be fixedly attached (e.g., welded) to support bar 36 so that each support arm 30 is rotatable with bar 36 about rotational axis R-R on the axle of the base structure.

As shown in FIG. 3, for example, support bar 36 may be rotatable in: first rotational direction RD1 responsive to a first rotational force applied to support bar 36 and/or support arms 30; and in second rotational direction RD2 responsive to a second rotational force applied to bar 36 and/or arms 30. The first rotational force may be caused by gravity forces applied to support arms 30 and the second rotational forces may be caused by forces applied to support bar 36 and/or support arms 30 with a drive element (e.g., such as drive element 120 described below). The formfitting abutment may be established once contact surfaces of forward segments 32 make contact with plurality of side surfaces 4, allowing each forward segment 32 to move independently of its rearward segment 33 and support bar 36 in one or more directions responsive to the gravity forces so that the contact surfaces automatically conform more closely to the physical shape of the one or more side surfaces of plurality of side surfaces 4. Because support arms 30 are rotatable with support bar 36, the formfitting abutment may be maintained by the gravity forces and/or an additional torque applied to support bar 36 (e.g., by the drive element and/or a resilient element). Once maintained in this manner, the formfitting abutment may: (i) stabilize upper portions of stacked load 2; (ii) prevent the formation of any log-sized gaps between support arms 30 and side surfaces 4; and (iii) allow guide surfaces 31 more effectively guide any logs 3 released from stacked load 2 away from unbinding area 10 along escape path E.

Different drive elements may be utilized to rotate support bar 36 in first rotational direction RD1 and second rotational direction RD2. Each drive element may comprise electronic devices and/or mechanical linkages (e.g., gears, pulleys, etc.) operable therewith, including: a linear actuator operable with a cable to rotate support bar 36 in directions RD1 and RD2 by applying torque to support bar 36 with the cable (e.g., such an electric winch like those sold by WARN® Industries); a rotational actuator operable to apply torque to support bar 36 without the cable (e.g., such as a direct-drive motor like those sold by Genesis Robotics); and/or any other similarly capable elements. Manual mechanisms and related tools also may be used to move or adjust support bar 36 and/or any one or more support arms 30.

Numerous aspects of unbinding apparatus 20 have been described, each comprising a plurality of support arms 30 moveable toward plurality of side surfaces 4 to establish the formfitting abutment. Any aspects described herein may be applicable to any number of support arms 30 (e.g., one or more), any type of base structure, any type of driving mechanisms, and/or any controller operable to cause the described movements. Similar results may be realized with any such technologies by performing a method comprising: moving plurality of support arms 30 toward plurality of side surfaces 4 of logs 3; and independently moving each support arm 30 of plurality of support arms 30 relative to at least one other support arm 30 of plurality of support arms 30 in one or more directions responsive to physical shape of plurality of side surfaces 4 to establish a formfitting abutment between plurality of support arms 30 and plurality of side surfaces 4.

Put another way, any variation of apparatus 20 described herein may comprise a plurality of support arms 30 movable toward a plurality of side surfaces 4 of stacked load 2. Each support arm 30 of the plurality of support arms 30 may comprise a guide surface 31 and be: adjustable to abut against one or more side surfaces of plurality of side surfaces 4; and independently movable relative to plurality of support arms 30 in one or more directions responsive to a physical shape of the one or more plurality of side surfaces 4 to establish a formfitting abutment between plurality of support arms 30 and plurality of side surfaces 4. Once the formfitting abutment is established, guide surfaces 31 of plurality of support arms 30 may be positioned and operative to guide a log 3 released from stacked load 2 along an escape path E over and away from an unbinding area 10 adjacent stacked load 2.

Additional aspects are now described with reference to an exemplary unbinding system 100 comprising a plurality of support arms 101 and various elements operable therewith to protect operator 1 when working in unbinding area 10. As shown in FIGS. 1 and 2, for example, unbinding system 100 may comprise plurality of support arms 101, a base structure 110, a drive unit 120, and a controller 130.

Figure 9:
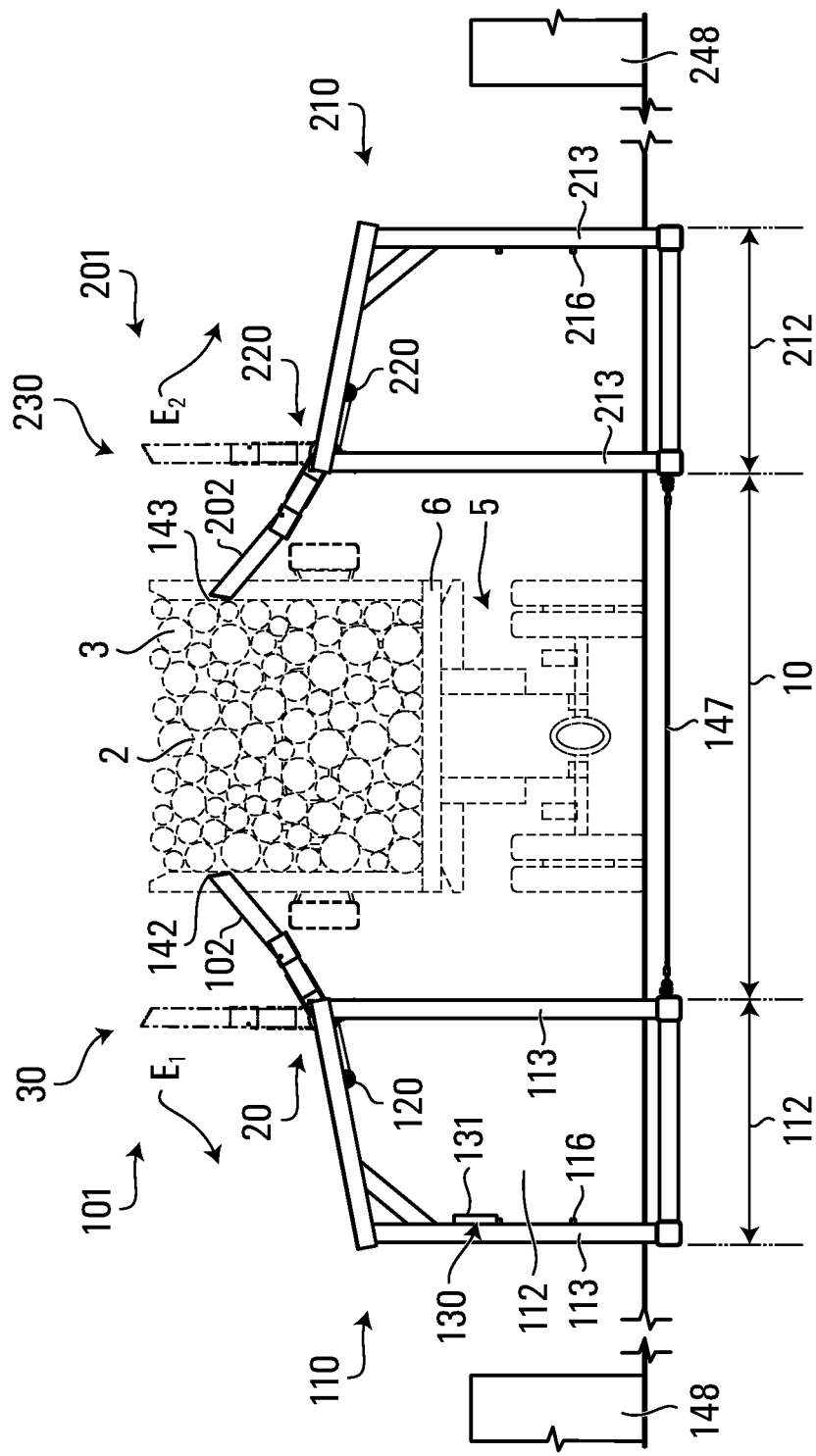
FIG. 9 depicts a cross-sectional view of an exemplary unbinding apparatus and system comprising a plurality of support arms movable toward a plurality of side surfaces of a stacked load.

Plurality of support arms 101 may comprise any support arm 30 described herein. As shown in FIG. 1, for example, unbinding system 100 may comprise a plurality of unbinding apparatus 20 described above, each apparatus 20 may comprise at least one group of support arms 30 described above, and plurality of support arms 101 may comprise each support arm 30 from each group. The terms "plurality of support arms 30" and "plurality of support arms 101" may thus be used interchangeably in some examples described herein. Accordingly, as shown in FIG. 9, for example, plurality of support arms 101 (e.g., like plurality of support arms 30) may similarly define guide surfaces 102 (e.g., like guide surfaces 31) that are spaced apart and/or sloped to cause any released logs 3 to roll over and away from unbinding area 10 and operator 1 along an escape path E1 after establishing the formfitting abutment.

In keeping with above, each unbinding apparatus 20 may comprise a support bar 36 (e.g., as shown in FIGS. 3-5) operable to move each group of support arms 30 in plurality of support arms 101 toward plurality of side surfaces 4 independent of the other groups. Unbinding system 100 may therefore comprise a plurality of support bars 36 operable to move different groups of support arms 30 in plurality of support arms 101, each support bar 36 being independently moveable with a different drive unit 120 to move one of the different groups of support arms 30 relative to a different portion of base structure 110, allowing the formfitting abutment between plurality of support arms 101 and plurality of side surfaces 4 to be responsive to the physical shape of the one or more side surfaces of plurality of side surfaces 4 along longitudinal axis X-X with independent movements of each group of support arms 30, each support arm 30 in each group, and/or support bars 36. As above, a rearward segment 33 of each support arm 30 may be attached to one support bar 36 and a forward segment 32 of that support arm 30 may be moveable independently of its rearward segment 33 and the one support bar 36.

As shown in FIG. 1, for example, base structure 110 may comprise a structural frame (e.g., a steel and/or concrete frame) adapted to position plurality of support arms 101 relative to longitudinal axis X-X of unbinding area 10 and define a covered operating area 112 adjacent unbinding area 10. Base structure 110 may comprise additional guide surfaces 111 adapted to guide a log 3 released from stacked load 2 along escape path E after moving (e.g., rolling and/or sliding) over guide surfaces 102 of plurality of support arms 101. Base structure 110 may be designed to protect covered operating area 112 if any logs 3 come to rest on additional guide surfaces 111. As shown in FIG. 1, for example, base structure 110 may comprise columns 113, girders 114, beams 115, and guide structures 116.

Columns 113 and girders 114 may comprise structural shapes (e.g., steel tubes) that are fixedly attached together (e.g., welded) to form moment-resisting frames. Beams 115 may comprise structural shapes (e.g., steel tubes) extending between the moment-resisting frames. Additional guide surfaces 111 may comprise the top surfaces of girders 114, a decking material located on the top surface of girders 114, and/or beams 115. As shown in FIG. 2, for example, guide surfaces 102 may have a first slope and/or a first surface treatment (e.g., smoothed surfaces) causing a log 3 released from stacked load 2 to roll along escape path E1 at an escape velocity with gravity forces. Additional guide surfaces 111 may have a second slope (e.g., less than the first slope)

and/or a second surface treatment (e.g., roughened surfaces) causing a reduction in the escape velocity of the released object 3 along at least a portion of escape path E1.

Base structure 110 may comprise rotational surfaces for plurality of support bars 36. As shown in FIG. 3, for example, base structure 110 may comprise a bar 117 extending between a pair of columns 113 along rotational axis R-R and each support bar 36 may comprise interior surfaces that are rotatable on exterior surfaces of bar 117. As shown in FIG. 1, for example, beams 115 may comprise a reaction shape 118 (e.g., a steel tube) extending between each pair of moment-resisting frames at a location adjacent each support bar 36. Reaction shape 118 may stabilize base structure 110 and comprise stop surfaces operable with corresponding stop surfaces of support arms 30 and/or support bar 36 to limit movements of support arms 30 by transferring forces to base structure 110.

Figure 8:
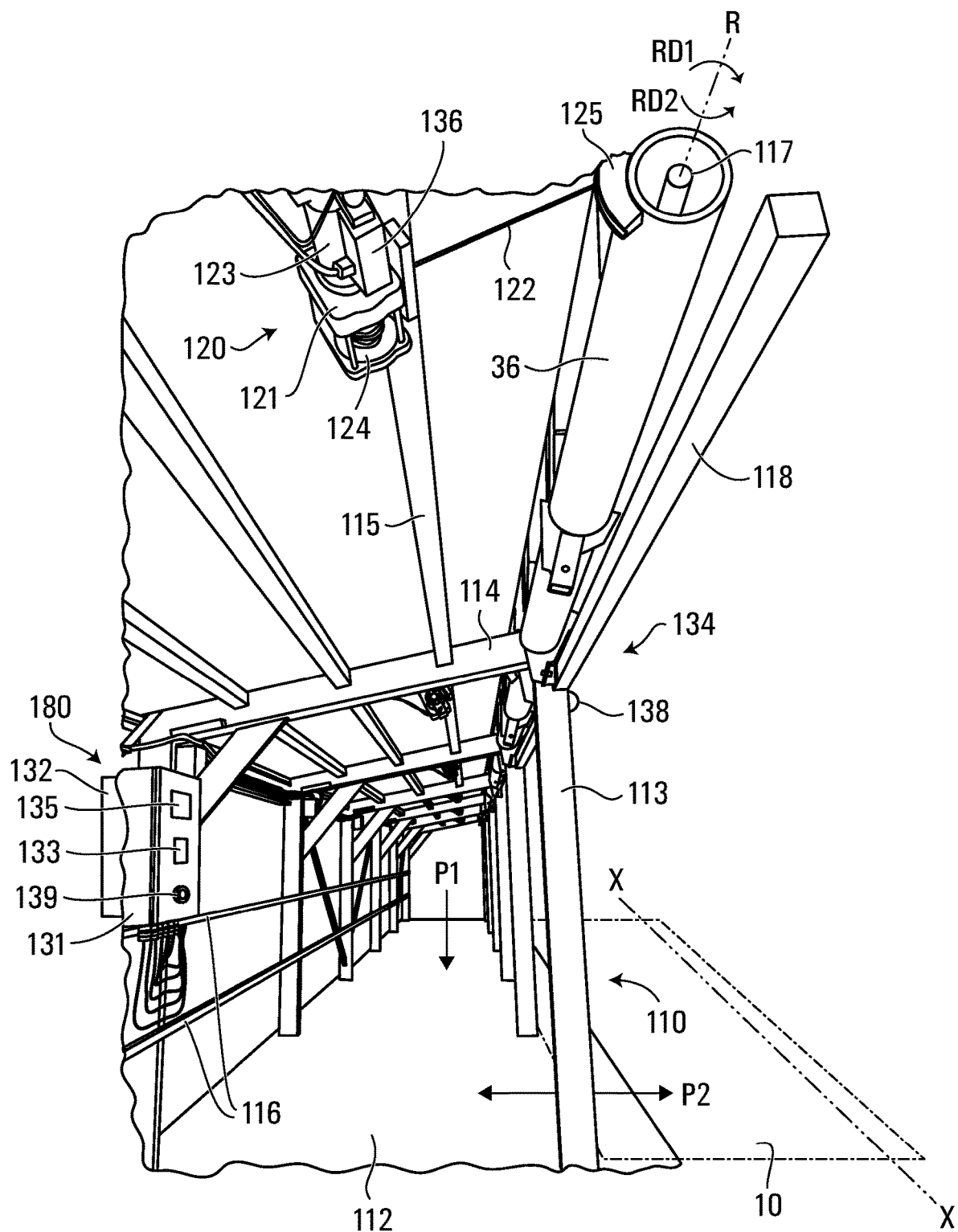
FIG. 8 depicts an additional side view of the FIG. 1 apparatus and system.

As shown in FIG. 8, for example, guide structures 116 may comprise fencing, rails, walls, and/or similar barriers positioned to define a path for protecting operator 1 at times prior to and/or when moving plurality of support arms 101. As shown in FIG. 8, for example, operator 1 may park truck 5 in unbinding 10 to locate stacked load 2 adjacent plurality of support arms 101, exit truck 5 with binders 9 still attached to stacked load 2 and bed 6, and walk along a first path P1 leading from unbinding area 10 toward input device 133 under covered area 112. Without leaving the protection of base structure 110, operator 1 may then use input device 133 to cause plurality of support arms 101 to move toward stacked load 2. After confirming that formfitting abutment has been established (e.g., visually or with the aid of technology, such as input device 133 and/or controller 130 described herein), operator 1 may then walk into unbinding area 10 along a second path P2 toward truck 5 to remove binders 9 under the protection of plurality of support arms 101, return to input device 133 along second path P2, use input device 133 to cause plurality of support arms 101 to move away from stacked load 2, and return to truck 5 along first path P1, all under the continuous protection of at least one of plurality of support arms 101 and base structure 110. First path P1 and second path P2 may be defined by guide structures 116 to prevent operator 1 from moving in one or more directions relative to stacked load 2 after removing binders 9, such as behind base structure 110, where they might be struck by a released object 3 rolling away from load 2 on escape path E1. As shown in FIG. 2, for example, guide structures 116 may comprise any structural shapes (e.g., steel tubes) extending between columns 113 to define boundaries of the first and second paths, including that also used for structural bracing or other purposes.

Each group of support arms 30 in plurality of support arms 101 may be movable with a different drive unit 120. As shown in FIG. 2, for example, each drive unit 120 may comprise a winch 121 operable with a cable 122 to rotate each support bar 36 and any support arms 30 attached thereto in first rotational direction RD1 and second rotational direction RD2. As shown in FIG. 8, for example, winch 121 may comprise an electric motor 123 operable to rotate a spool 124 in a first drive direction responsive to a first control signal and a second drive direction responsive to a second control signal, in which the first drive direction is opposite of first rotational direction RD1 and the second drive direction is opposite of second rotational direction RD2. Each support bar 36 may thus be rotated in first rotational direction RD1 by releasing cable 122 with drive unit 120 responsive to the first control signal; and rotated in second rotational direction by applying the pull force to cable 122 with drive unit 120 responsive to the second control signal.

Winch 121 may be fixedly attached (e.g., bolted or welded) to one or more beams 115 that have been sized to transfer reaction forces from winch 121 to base structure 110. As shown in FIG. 8, for example, each support bar 36 may comprise a receiving structure 125 operable with cable 122 to rotate its group of arms 30 with the pull force applied by winch 121. As shown in FIG. 3, for example, receiving structure 125 may comprise a platform 126 and stop surfaces 127. Platform 126 may extend outwardly from support bar 36 to define a track adapted to receive cable 122. As shown in FIG. 8, for example, winch 121 may be attached to one beam 115 and adapted to align cable 122 with the track of platform 126. In this example, one end of cable platform 126 may comprise a structural plate (e.g., a steel plate) defining an opening that is removably attachable to one end of cable 122 so that platform 126 may convert linear pull forces applied to cable 122 into a torque applied to support bar 36.

Stop surfaces 127 may be operable with reaction shape 118 to limit rotations of support bar 36 in rotational directions RD1 and RD2. As shown in FIG. 3, for example, stop surfaces 127 may comprise a first stop surface 128 and a second stop surface 129. First stop surface 128 may contact a first side of reaction shape 118 to prevent support arm 30 from rotating in first rotational direction RD1 and second stop surface 129 may contact a second side of reaction shape 118 to prevent support arm 30 from rotating in second rotational direction RD2. First stop surface 128 and second stop surface 129 may be positioned relative to one another on support bar 36 to define a range of motion M for support arm 30. As shown in FIG. 3, for example, first stop surfaces 128 may define how far support arm 30 may be rotated in first rotational direction RD1 toward plurality of side surfaces 4 at a first end of range of motion M by releasing cable 122 and second stop surfaces 129 may define how far support arm 30 may be rotated in second rotational direction RD2 at a second end of range of motion M by pulling cable 122.

Controller 130 may comprise electronic components adapted to communicate and process data within unbinding system 100, including any components located proximate to and/or remote from each unbinding apparatus 20 in system 100. As shown in FIG. 8, for example, controller 130 may comprise a housing 131, a processing unit 132, input device 133, a sensor 134, and a signalling device 135. Housing 131 may comprise a moisture-resistant container, including any type of metal and/or plastic box. As shown in FIG. 8, for example, processing unit 132 may be mounted in housing 131 and elements of input device 133, sensor 134, and/or signalling device 135 may be mounted to housing 131. To accommodate different types of data communication, housing 131 may comprise a polymeric material adapted to pass the electronic signals with wires and/or wirelessly therethrough.

Processing unit 132 may comprise any known computing technologies adapted to receive data from input device 133 and/or sensor 134 over a network, generate control signals with program objects based on the received data, and output the control signals to other elements of unbinding system 100 over the network. The computing technologies may comprise any combination of one or more processors, a memory, and a transceiver, a communication bus, and a power source. Elements of the processor(s), memory, transceiver, and/or communication bus may be local to and/or remote from processing unit 132. The transceiver and the communication bus may comprise data communication technologies operable to send and/or receive data over the network, including wired and/or wireless data communication technologies operable with a wired and/or wireless network. The program objects may comprise lines of code executable with processing unit 132 to control certain functions of unbinding system 100. In keeping with above, for example, one program object may comprise lines of code that are executable with processor unit 132 to: receive data from input device 133 and/or sensor 134; output the first control signals to drive element 120 when the received data indicates that operator 1 is located in covered operating area 112; and stop outputting the first control signals when the received data indicates that formfitting abutment has been established.

Input device 133 may comprise any known data input device (e.g., a button, a camera, a microphone, a screen, a switch, and the like). As shown in FIG. 8, for example, input device 133 may comprise a touchscreen located in covered operating area 112 of base structure 110. Because of its physical location, input device 133 may only be activated by operator 1 when they are located in area 112. When activated, input device 133 may output notification signals to processing unit 132 causing output of the first control signals drive elements 120, which in turn may cause plurality of arms 101 to rotate in first rotational direction RD1 toward plurality of side surfaces 4. Input device 133 may comprise location-based controls. For example, if input device 133 comprises a mobile computing device (e.g., like a smartphone), then it may comprise a program object (e.g., part of an application) that prevents operator 1 from operating input device 133 when location data associated with the mobile computing device (e.g., GPS signals) indicates that operator 1 is located in unbinding area 10 and/or not located in covered area 112.

Sensor 134 may comprise one or more sensors in data communication with processing unit 132 over the network. As shown in FIG. 8, for example, sensor 134 may comprise a linear force sensor 136, a contact force sensor 137, a visual contact sensor 138, and/or an operator sensor 139. Each of these sensors may be positioned about unbinding system 100, in data communication with processing unit 132, and operable to with other elements of system 100 to provide additional protections for operator 1.

As shown in FIG. 8, for example, linear force sensor 136 may comprise an axial force sensor that is located in drive unit 120 and operable to output data to processor 132 for determining when formfitting abutment has been established by measuring the pull forces applied to cable 122. As shown in FIG. 3, for example, contact force sensor 137 may comprise an impact sensor that is located on a contact surface of contact end 47 and operable to output data to processor 132 for determining when the contact end 47 makes contact with plurality of side surfaces 4 and/or measuring a force associated that contact. As shown in FIG. 8, for example, visual contact sensor 138 may comprise one or more cameras that are mounted to columns 113, oriented toward unbinding area 10, and operable to output visual data (e.g., a video feed) to processing unit 132 for determining: (i) if truck 5 is properly located in unbinding area 10 (e.g., along longitudinal axis X-X); (ii) whether the formfitting abutment has been established between plurality of support arms 101 and plurality of side surfaces 4; and/or (iii) whether operator 1 is located in unbinding area 10. As shown in FIG. 8, for example, operator sensor 139 may comprise one or more cameras that are located proximate to input device 133 (e.g., on housing 131), oriented toward a face of operator 1 when operating input device 133, and operable to output visual data (e.g., a video feed) to processing unit 132 for locating operator 1 in covered operating area 112 (e.g., with shape recognition) and/or identifying operator 1 (e.g., with facial recognition) prior to moving plurality of support arms 101.

In these examples, processing unit 132 may execute program objects comprising lines of code for determining and managing the formfitting abutment between plurality of support arms 101 and plurality of side surfaces 4 has been established by: analyzing the data output from sensors 136, 137, 138, and/or 139; executing timing sequences for moving plurality of support arms 101 responsive thereto; and/or any using AI- and/or human-powered prediction tools to modify the timing sequences responsive to the data from sensors 136, 137, 138, and/or 139.

Signalling devices 135 may comprise any known audiovisual output device (e.g., a screen, a light, speaker, and the like). As shown in FIG. 8, for example, signalling device 135 may comprise a display screen that is visible from covered operating area 112 and/or unbinding area 10 (e.g., mounted on housing 131) and a loudspeaker that is audible from area 112 and/or area 10. The display screen and loudspeaker may be operable with processor 132 to output: a first audiovisual communication signal (e.g., a first color or sound) while plurality of support arms 101 are being rotated toward plurality of side surfaces 4, signalling that protections are not in place because the formfitting abutment is not established; a second audiovisual communication signal (e.g., a second color or sound) after the formfitting abutment has been established, signalling that the protections are in place; and a third audiovisual communication signal (e.g., a third color or sound) while plurality of support arms 101 are being rotated away from plurality of side surfaces 4, signalling that the protections are no longer in place because the formfitting abut is not established. For example, the first audiovisual communication signal may be output responsive to the first input signal for drive unit 120; and the third audiovisual communication signal may be output responsive to the second input signal for drive unit 120.

The functionality provided by each element of controller 130, including processing unit 132, input device 133, and/or signalling device 135, may be performed by a mobile computing device. For example, controller 130 may comprise a phone (e.g., such as an Apple® iPhone® or Android® phone), the one or more program objects may comprise an application operable with the phone, processing unit 132 may comprise a processor of the phone, and both of input device 133 and signalling device 135 may comprise a touchscreen display of the phone. In this example, operator 1 may use an unbinding application of the mobile computing device (e.g., the phone): (i) as input 133 by providing a graphical user interface allowing operating 1 to cause plurality of support arms 101 to move toward plurality of side surfaces 4; (ii) as processing unit 132 by providing computational means for receiving data from sensor 134 and determining whether a formfitting abutment has been established between plurality of support arms 101 and plurality of side surfaces 4; (iii) as signalling device 135 by outputting the first, second, and/or third audiovisuals with the graphical user interface and related components; and (iv) as any combination thereof to perform any related functions described herein—all without requiring operator 1 exit truck 5 before the protections afforded by system 100 are in place.

Put another way, unbinding system 100 may comprise at least one unbinding apparatus 20 for unbinding stacked load 2. For example, each apparatus 20 in system 100 may comprise a plurality of support arms 101 movable toward a plurality of side surfaces 4 of stacked load 2. Each support arm 30 of plurality of support arms 101 may comprise a guide surface 31 and be: adjustable to abut against one or more side surfaces of the plurality of side surfaces 4; and independently movable relative to plurality of support arms 101 in one or more directions responsive to a physical shape of the one or more side surfaces to establish a formfitting abutment between plurality of support arms 101 and plurality of side surfaces 4. Once the formfitting abutment is established, guide surfaces 102 of plurality of support arms 101 may be positioned and operative to guide a log 3 released from stacked load 2 along an escape path E over and away from an unbinding area 10 adjacent stacked load 2.

Unbinding system 100 may comprise an opposing pair of unbinding apparatus 20, allowing different pluralities of support arms to contact each side of stacked load 2. As shown in FIG. 9, for example, unbinding system 100 may comprise unbinding apparatus 20 comprising plurality of support arms 101 with groups of support arms 30 (as described above) and a second unbinding apparatus 220 (e.g., similar to apparatus 20) comprising a second plurality of support arms 201 (e.g., similar to plurality of arms 101) with second groups of support arms 30 (e.g., as before). As shown in FIG. 9, for example, plurality of support arms 101 may be movable to establish a formfitting abutment with plurality of side surfaces 4 on a first side of stacked load 2 and truck 5 (e.g., shown at left in FIG. 9); and plurality of support arms 201 may be movable to establish a second formfitting abutment with plurality of side surfaces 4 on a second side of stacked load 2 and truck 5 (e.g., shown at right in FIG. 9). Each unbinding apparatus 20 may comprise its own base structure 110, covered operating area 112, and/or drive units 120. As shown in FIG. 9, for example, second apparatus 220 may comprise the same elements as first apparatus 120, but with element numbers in the 200 series of numbers, including a base structure 210, a covered operating area 212, a drive unit 280, and any other elements described above whether or not they are given a 200 series reference number. Unbinding system 100 may comprise any number of unbinding apparatus 20 and/or 220 spaced apart along longitudinal axis X-X, allowing the unloading facility to size unbinding area 10 relative to an expected length of truck 5.

Aspects of unbinding system 100 may be modified to accommodate unbinding apparatus 20 and 220. As shown in FIG. 9, for example, a tension element 147 (e.g., a steel cable) may extend between base structure 110 and base structure 210 to link those structures together and transfer tensile forces therebetween. Other aspects of system 100 may accommodate unbinding apparatus 20 and 220 with little or no modification. As shown in FIG. 9, for example, controller 130 may be operable with a single input device 133 to cause movements of pluralities of support arms 101 and 201 toward the first and second sides of stacked load 2 by modifying the program objects executable therewith to receive, generate, and output additional signals for causing first and second formfitting abutments. As shown in FIG. 9, for example, base structure 110 may be flanked by a retaining structure 148 (e.g., a concrete wall) and base structure 210 may be similarly flanked by a retaining structure 248 (e.g., a concrete wall). Retaining structures 148 and 248 may comprise concrete and steel adapted to contain logs 3 released from stacked load 2 and guided over areas 112 and 212.

Put another way, unbinding system may comprise a first apparatus 20 for unbinding stacked load 2. For example, first apparatus 20 may be located on a first side of stacked load 2 and comprise a plurality of first support arms 101 movable toward a plurality of first side surfaces 142 on the first side of stacked load 2, each first support arm 30 of plurality of first support arms 101 comprising a first guide surface 102 and being adjustable to abut against one or more first side surfaces of the plurality of first side surfaces 142, and independently movable relative to plurality of first support arms 101 in one or more directions responsive to a first physical shape of the one or more first side surfaces to establish a first formfitting abutment between plurality of first support arms 101 and plurality of first side surfaces 142. System 100 may comprise a second apparatus 220 for unbinding stacked load 2. For example, second apparatus 220 may be located on a second side of stacked load 2 and comprise a plurality of second support arms 201 movable toward a plurality of second side surfaces 143 on the second side of stacked load 2, each second support arm 230 of plurality of second support arms 201 comprising a second guide surface 202 and being adjustable to abut against one or more second side surfaces of the plurality of second side surfaces 143, and independently movable relative to plurality of second support arms 201 in one or more directions responsive to a second physical shape of the one or more second side surfaces to establish a second formfitting abutment between plurality of second support arms 201 and plurality of second side surfaces 143. Once the first and second formfitting abutments are established, first and second guide surfaces 102, 202 of the respective pluralities of first and second support arms 101, 201 may be positioned and operative to guide a log 3 released from stacked load 2 along a first escape path E1 over and away from a first portion of unbinding area 10 adjacent the first side of stacked load 2 or a second escape path E2 over and away from a second portion of unbinding area 10 adjacent the second side of stacked load 2.

Additional aspects of unbinding apparatus 20 and/or unbinding system 100 are now described with reference to FIGS. 10-12, each of which show additional and/or alternative components for protecting operator 1 from logs 3 released from stacked load 2. In keeping with above, any combinations of these additional and/or alternative components may be sold together with unbinding apparatus 20, as part of unbinding system 100, and/or as a kit operable therewith, providing enumerable ways to make the protective hardware and software described herein available to the market.

Unbinding system 100 may comprise additional hardware. As shown in FIG. 10, for example, a mesh 300 may span between each groups of support arms 30 and 230 in pluralities 101 and 201 to provide operator 1 with a continuous layer of protection against logs 3 and/or debris associated therewith. Any mesh materials may be used to make mesh 300, including any combination of a steel, nylon, and/or similar materials. The strength of mesh 300 may be determined by the mesh materials according to the desired protections. For example, if stacked load 2 typically contains shorter logs 3 (e.g., branch lengths) mixed in and bundled together with a number of longer elongated objects (e.g., tree length), then it may be desirable to deploy a mesh 300 made from metallic materials (e.g., steel) that are strong enough to support a maximum design weight of the shorter logs 3, each of which may pose an additional risk to operator 1 because they can more easily pop out from between side rails 7. If each log 3 typically has a large amount of smaller branches and/or debris attached thereto, such as loose dirt and rocks, then it may be preferable to deploy a lighter, less expensive mesh 300 made from polymeric materials (e.g., nylon) that are strong enough to catch and support a maximum design weight associated with the smaller branches and/or debris.

Mesh 300 may be attached to pluralities of support arms 101 and 201 using any known connecting hardware. As shown in FIG. 10, for example, plurality of support arms 101 may comprise different groups of support arms 30 (e.g., groups of three) movable together responsive to one drive unit 120 and mesh 300 may be attached to and/or span between guide surfaces 102 in each group. As shown in FIG. 10, for example, mesh 300 may be rotatable with plurality of support arms 101 about rotational axis R-R in first rotational direction RD1 and second rotational direction RD2 and yet be loosely fit over each group of support arms 30 in plurality 101 to accommodate independent movements of forward segments 32. As shown in FIG. 10, for example, an exemplary group of three support arms 30 may comprise an outer-most arm 301, a central arm 302, and an inner-most arm 303 that are operable with one support bar 36 and drive element 120. Mesh 300 may be fixedly attached to outer-most arm 301 and inner-most arm 303 and slidably attached to central arm 302 that creates slack allowing for independent movements of each forward segment 32 of support arms 301, 302, and 303. As shown in FIG. 10, for example, mesh 300 may be attached to base structures 110 and/or 210 to provide continuous protection for operator 1 along one or more pathways between unbinding area 10 and covered operating area 112.

In keeping with above, guide structures 116 may comprise additional amounts of mesh 300 that are similarly attached to base structures 110 and/or 210 to define boundaries of pathways and/or one or more gateways leading to and from the pathways. For example, the gateways may comprise any known egress management technologies, including lockable gates with locking mechanisms that are controllable by processing unit 132 responsive to sensor 134 so as to physically restrict access to unbinding area 10 and/or input device 133 at different times according to a program object.

Figure 10:
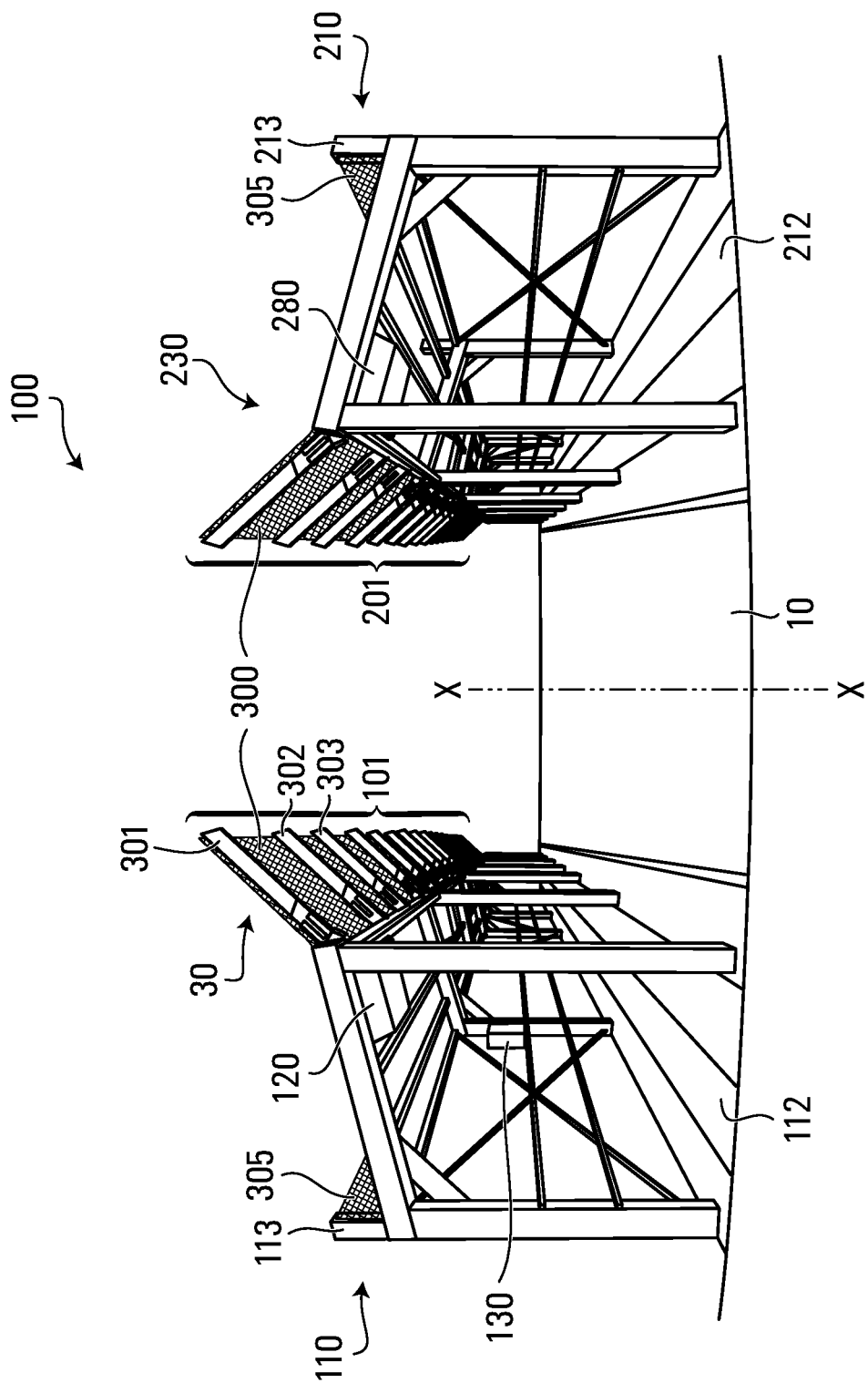
FIG. 10 depicts an entrance-facing view of an exemplary unbinding apparatus and system comprising a plurality of support arms movable toward a plurality of side surfaces of a stacked load.

As shown in FIG. 10, for example, a mesh 305 may be mounted to base structure 110 and/or base structure 210 to provide a catch for logs 3 released from stacked load 2 at unloading facilities where it is not feasible to utilize retaining structures 148 and 248. In this example, top portions of columns 113 of base structure 110 may be extended vertically above additional guide surfaces 111 and mesh 305 may be extended therebetween; and top portions of columns 213 of base structure 210 may be extended vertically above additional guide surfaces 211 and additional mesh 305 may be extended therebetween. Mesh 305 may be stronger than mesh 300. For example, mesh 300 may comprise a nylon mesh designed to support gravity loads associated with a portion of a log 3 and mesh 305 may comprise a steel mesh designed to withstand impact forces applied by a log 3 after being released from stacked load 2 and rolling toward mesh 305 along escape path E1.

As a further example, it is contemplated that the top portions of columns 113 may be further modified to merely slow down released logs 3. For example, similarly to as shown in FIG. 10, the top portions of columns 113 may be pivotally attached to base structure 110 with joints and resilient elements (e.g., similar to those described above) adapted to rotate the top portions of columns 113 away from base structure 110 after making contact with a log 3 in order to slow its roll and rotate the top portions of columns 113 back towards base structure 110 into an undeflected position.

Unbinding system 100 may comprise additional hardware for contacting plurality of side surfaces 4. As shown in FIG. 11, for example, a contact end 346 of a support arm 330 may comprise a shoe 310 that is larger than contact end 346 and therefore better suited to contact plurality of side surfaces 4 of multiple logs 3 in stacked load 2. Any support arm 30 described herein may be similarly attached to its own shoe 310 or a larger shoe 310 spanning multiple arms 30 or 230, providing the unloading facility with additional protective options. As shown in FIG. 11, for example, shoe 310 may comprise a pivot 311, a pivot structure 312, a bracing structure 313, and a contact plate 314.

Pivot 311 may comprise a pin (e.g., a steel bolt or rod) extending outward from contact end 346 to provide support surfaces for pivot structure 312. As shown in FIG. 11, for example, the pin may comprise a circular cross-sectional shape extending outward from contact end 346 in a direction parallel to rotational axis R-R. Pivot structure 312 may comprise a plate (e.g., a steel plate) having a triangular shape defining a top opening operable with pivot 311 and a bottom surface fixedly attached to contact plate 314. The top opening of pivot structure 312 may receive pivot 311 and define rotational surfaces that permit rotation of shoe 312 relative to contact end 346. As shown in FIG. 11, for example, the top opening of pivot structure 312 may comprise a circular cross-sectional shape receives the circular cross-sectional shape of pivot 311 and defines rotational surfaces permitting rotation of pivot structure 312 relative to contact end 346. The rotational surfaces may be smoothed and/or comprise friction reducing surface treatments (e.g., grease) so that shoe 310 rotates freely relative to contact end 346.

Bracing structure 313 may comprise one or more additional plates (e.g., steel plates) extending between pivot structure 312 and contact plate 314, each of which may be fixedly attached to one other to enhance the structural stiffness of shoe 310. Contact plate 314 may define a contact area sized to contact side surfaces 4 of multiple logs 3 in stacked load 2. As shown in FIG. 11, for example, the contact area of contact plate 314 may comprise a vertical length 315 sized between plurality of side surfaces 4 of a plurality of logs 3 and a horizontal length (e.g., into the page) sized to accommodate a distance between side rails 7. The horizontal length of contact plate 314 may extend along rotational axis R-R. As shown in FIG. 11, for example, side rails 7 may be separated by a typical length (e.g., 8'-0") and the horizontal length of contact plate 314 may be shorter than the typical length. Each contact end 346 of each support arm 30 may have its own shoe 310 with a separate contact plate 314.

Figure 11:
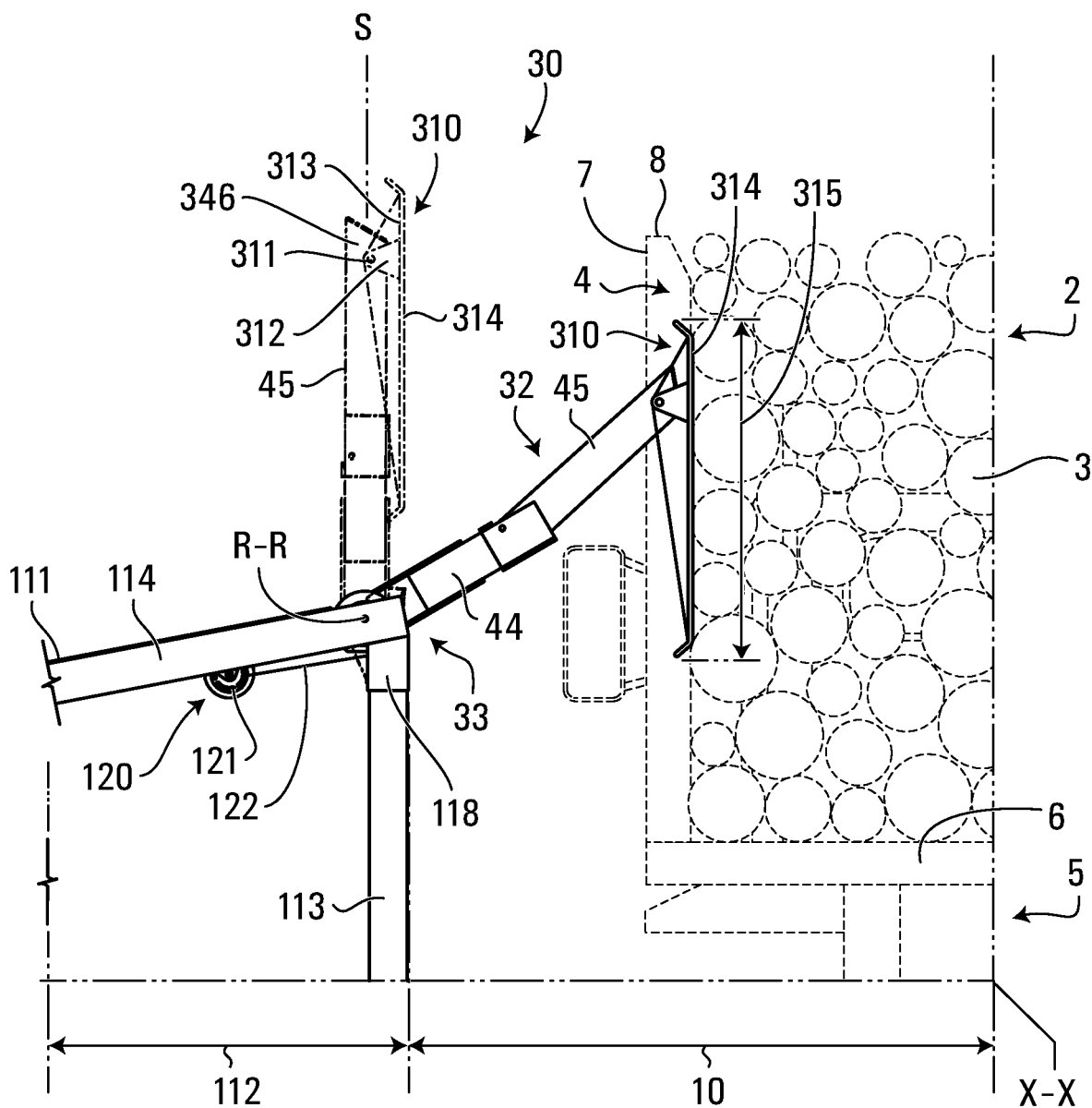
FIG. 11 depicts a cross-sectional view of an exemplary unbinding apparatus and system comprising a plurality of support arms movable toward a plurality of side surfaces of a stacked load.

As shown at left in FIG. 11, for example, support arm 30 may be rotated about rotational axis R-R in second rotational direction RD2 into an undeflected configuration, in which forward segment 32 and rearward segment 33 are aligned with support arm axis S-S. Shoe 310 may rotate relative to forward segment 32 and rearward segment 33 when rotating into the undeflected configuration until contact plate 314 makes contact with contact segment 45, placing shoe 310 into a rest position. As shown in FIG. 11, for example, truck 5 may be parked in unbinding area 10 when support arm 30 is in the undeflected position and shoe 310 is in the rest position. Support arm 30 then be rotated about rotational axis R-R in first rotational direction RD1 toward stacked load 2 until shoe 310 makes contact with plurality of side surfaces 4, causing support arm 30 to move into a deflected configuration, in which forward segment 32 and rearward segment 33 are no longer aligned with support arm axis S-S. Because of the rotatable connection between pivot 311 and pivot structure 312, shoe 310 may remain vertical by counterrotating on pivot 311 when support arm 30 is rotated toward stacked load 2 so that contact plate 314 remains generally aligned with plurality of side surfaces 4 until making contact therewith.

The addition of shoe 310 may not affect the performance of the one or more support arms 30. As shown in FIG. 11, for example, forward segment 32 may still be movable relative to rearward segment 33 along first movement path MP1 (e.g., FIG. 4) and/or second movement path MP2 (e.g., FIG. 5) responsive to reaction forces applied by plurality of side surfaces 4 to contact plate 314. As shown in FIGS. 6 and 7, for example, first resilient element 37 and/or second resilient element 50 may be sized to accommodate additional gravity forces applied to support arm 30 by shoe 310 so that the independent movements of forward segment 32 are approximately the same with or without shoe 310.

As shown in FIG. 11, for example, shoe 310 may span between one or more support arms 30 to increase the contact area defined by contact plate 314, such as between each support arm 30 in a group of three arms 30 (e.g., as shown in FIGS. 4 and 5). In this example, the horizontal length of plate 314 may be equal to or greater than the typical length between side rails 7 so that contact plate 314 spans therebetween to contain logs 3 by establishing the formfitting abutment between plurality of side surfaces 4 of side rails 7, which may be particularly desirable if stacked load 2 contains many smaller logs 3 (e.g., with a length smaller than the typical length), a particular type of debris (e.g., small rocks), and/or the unloading facility desires to create an even more protected zone of unbinding area 10.

Each support arm 30 may be moveable several directions. For example, a support arm 330 is now described with reference to FIG. 12, which depicts a rearward segment 333 of support arm 330 as being attached to support bar 36 and a forward segment 332 of arm 330 as being movable independent of rearward segment 333. Forward segment 332 may be movably attached to rearward segment 333 with a rearward joint 334 adapted to provide support arm 330 of forward segment 332 with a greater range of movement than forward segment 32 of support arm 30. As shown in FIG. 12, for example, support arm 330 may be movable in: a first direction 361 relative to rearward segment 333 along first movement path MP1 (e.g., shown as right); and a second, opposite direction 362 relative to rearward segment 333 along first movement path MP1 (e.g., shown as left).

Figure 12:
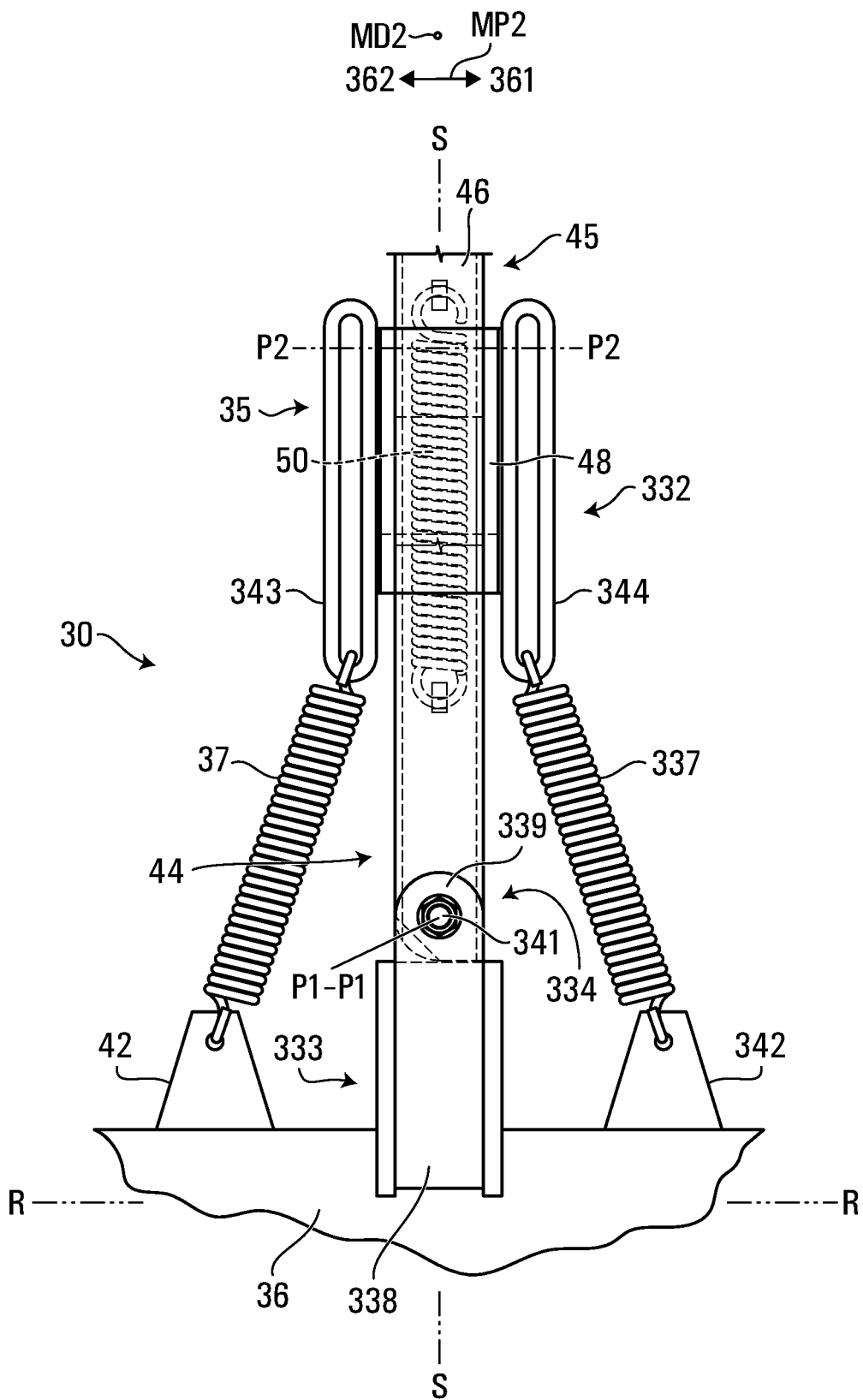
FIG. 12 depicts a top down view of an exemplary support arm of the plurality of support arms.

As shown in FIG. 12, for example, support arm 330 may comprise first resilient element 37 and a third element 337. First resilient element 37 may be as described above and thus similarly be operable to control movements of forward segment 332 longitudinally relative to rearward segment 333 in first direction 361 along first movement path MP1. As shown in FIG. 12, for example, first resilient element 37 may similarly extend between attachment 42 on support bar 36 and an elongated attachment 343 (e.g., a steel loop) on forward segment 332, and be sized to apply a first biasing force to attachments 42 and 343. As shown in FIG. 12, for example, elongated attachment 343 may comprise an elongated loop extending along a length of forward segment 332 and one end of first resilient element 37 may be slidably attached to the elongated loop. In this example, the elongated loop may be fixedly attached (e.g., welded) to one side of receiving end 48 in a direction parallel with support arm axis S-S.

Third resilient element 337 (e.g., a steel spring, a spring steel bar, an elastic loop, etc.) may be similar to first resilient element 37 and thus also similarly operable to control movements of forward segment 332 longitudinally relative to rearward segment 333 in second direction 362 along first movement path MP1. As shown in FIG. 12, for example, third resilient element 337 may similarly comprise a spring (e.g., a steel coil spring) extending between an attachment 342 (e.g., a steel plate) on support bar 36 and an elongated attachment 344 (e.g., a steel loop) on forward segment 332. The spring may be sized to apply a third biasing force to attachments 342 and 344. As shown in FIG. 12, for example, elongated attachment 343 may comprise an elongated loop extending along a length of support arm 330 and one end of resilient element 37 may be slidably attached to the elongated loop. In this example, the extended loop may be fixedly attached (e.g., welded) to other side of receiving end 48 in a direction parallel with support arm axis S-S.

As shown in FIG. 12, for example, rearward segment 333 may comprise a structural shape (e.g., a steel channel) defining an attachment end 338 and a receiving end 339. Attachment end 338 may be similar to attachment end 38 described above. Receiving end 339 may comprise ears (e.g., steel plates) with openings extending therethrough along a first pivot axis P1-P1 that is generally parallel with second movement path MP2 (e.g., generally vertical). As shown in FIG. 12, for example, rearward joint 334 may comprise a pivot 341 (e.g., a steel pin) extending through the openings of the ears along first pivot axis P1-P1 to provide a rotational surface for link segment 44 of forward segment 332. In contrast to above, the ears of receiving end 339 may extend outwardly from attachment end 338 so that link segment 44 may be rotated approximately 180° about first pivot axis P1-P1. Elongated attachments 343 and 344 may be utilized to preserve that range of motion.

As shown in FIG. 12, for example, moving forward segment 332 in first direction 361 may cause first resilient element 37 to expand along its length between attachment 42 and a lower left portion of elongated attachment 342, during which the end of resilient element 37 may slide around in the elongated loop of attachment 342 into an equilibrium position. Moving forward segment 332 in first direction 361 may likewise cause third resilient element 337 to contract along its length as elongated attachment 344 moves toward attachment 342, during which the end of resilient element 337 may slide around in the elongated loop of attachment 344 so that a maximum range of movement for forward segment 332 in first direction 361 is limited by a maximum elongated length of first resilient element 37 rather than an obstruction created by third resilient element 337. As also shown in FIG. 12, for example, moving forward segment 32 in second direction 362 may cause third resilient element 337 to expand and first resilient element 37 to contract in a similar, but opposite manner, so that a maximum range of movement for forward segment 332 in second direction 362 is similarly limited by a maximum elongated length of third resilient element 337 rather than an obstruction created by element 37.

As shown in FIG. 12, for example, the first biasing force applied by first resilient element 37 in combination with the third biasing force applied by third resilient element 337 may maintain support arm 330 in a undeflected configuration, in which forward segment 332 is aligned with rearward segment 333 along support arm axis S-S. For example, the respective springs of resilient elements 37 and 337 shown in FIG. 12 may be sized to pull on attachments 343 and 344 with generally equal and opposite tensile forces that maintain support arm 330 in the undeflected position absent external forces applied thereto. As also shown in FIG. 12, for example, support arm 330 may comprise a forward joint 35 with a second resilient element 50 as described above. In this example, elongated attachments 343 and 344 may be fixedly attached to the sides of receiving end 48 without comprising the ability of contact segment 45 to move relative to link segment 44 along second movement path MP2 regardless of the position of contact segment 45 relative to link segment 44 along first movement path MP1.

Figure 13:
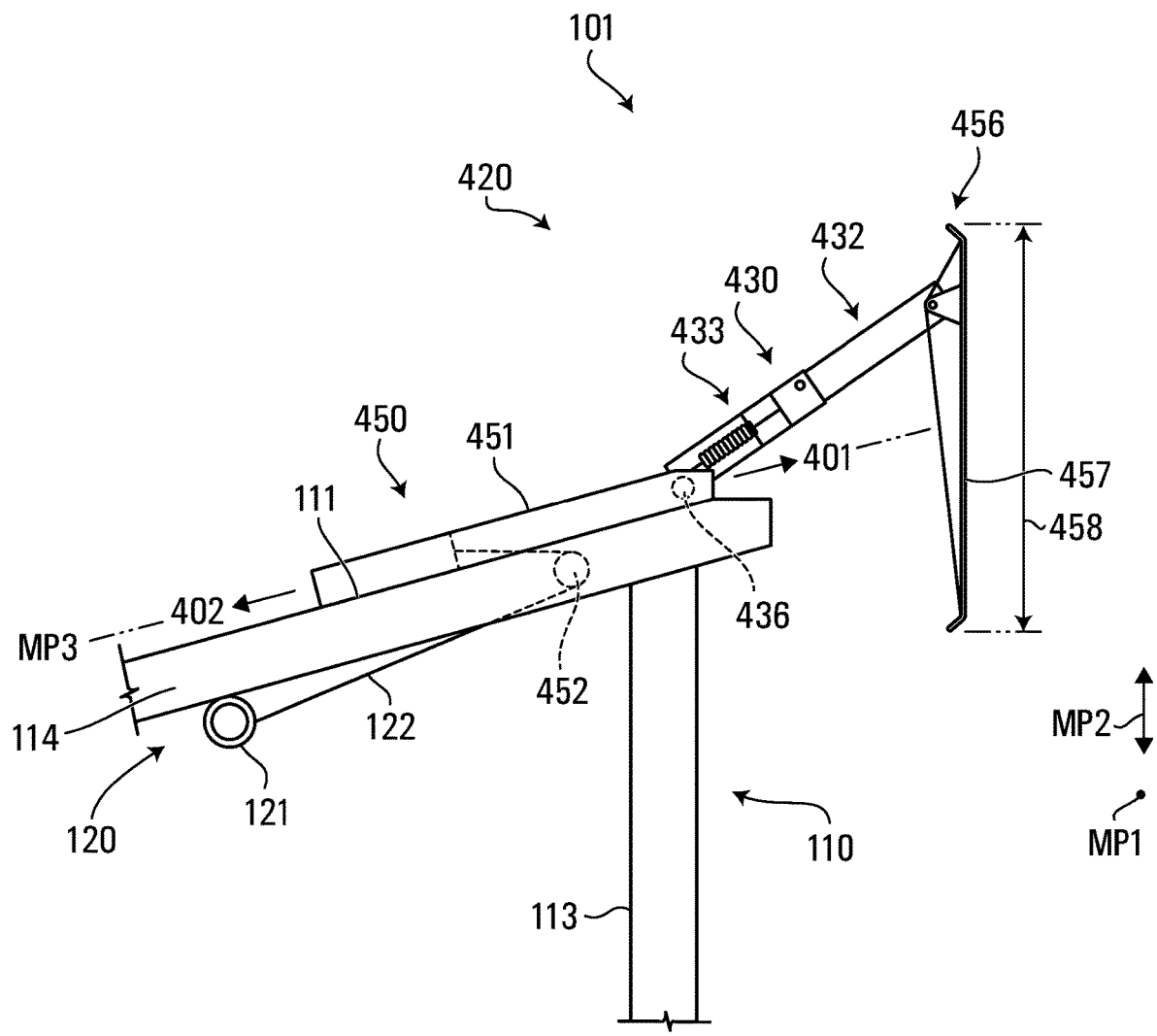
FIG. 13 depicts a side view of an exemplary unbinding apparatus and system comprising a plurality of support arms movable toward a plurality of side surfaces of a stacked load.

One or more support arms 30 may be slid toward stacked load 2. For example, an unbinding apparatus 420 is now described with reference to FIG. 13 as comprising a support arm 430 and a platform 450. Similar to above, support arm 430 may comprise a forward segment 432 and a rearward segment 433. Rearward segment 433 may be fixedly attached to a support bar 436 and forward segment 432 may be independently movable relative to rearward segment 433. In contrast to above, support bar 436 may be fixedly attached to platform 450 by a non-rotatable connection, meaning that support arm 430 may be non-rotatable in first rotational direction RD1 and/or second rotational direction RD2. As shown in FIG. 13, for example, platform 450 may comprise a platform body 451 that is slidably mounted on additional guide surfaces 111 of base structure 110 for movement along a third movement path MP3 that is non-parallel with first and second movement paths MP1 and MP2. Third movement path MP3 is shown as sloping upwards towards second movement path MP2 in FIG. 13 but may be sloped at any angle relative to path MP2. In this example, platform 450 and/or additional guide surfaces 111 may comprise tracks, wheels, and/or other sliding structures operable to move platform body 451 along third movement path MP3 in a first direction 401 toward stacked load 2 and a second direction 402 away from stacked load 2.

Support arm 430 may thus be slid with platform body 451 in first direction 401 until forward segment 432 makes contact with plurality of side surfaces 4. Platform body 451 may be slid in first direction 401 and second direction 402 by operation of drive unit 120 in a manner similar to above. As shown in FIG. 13, for example, drive unit 120 may similarly comprise winch 121 with cable 122 extending therefrom. Cable 122 may extend from winch 121, around a pulley 452 attached to base structure 110 (e.g., to one of beams 115), and back to platform body 451. Winch 122 may be similarly operable to rotate spool 124 (e.g., FIG. 8) in a first drive direction responsive to a first control signal from controller 130 and a second, opposite drive direction responsive to a second control signal from controller 130. Rotating spool 124 in the first drive direction may retract cable 122, causing platform body 451 to slide along additional guide surfaces 111 in first direction 401 responsive to a pull force applied by cable 122. Rotating spool 124 in the second drive direction may extend cable 122, causing platform body 451 to slide along additional guide surfaces 111 in second direction 402 responsive to gravity forces.

An advantage of unbinding apparatus 420 is that the non-rotatable connection between support bar 436 may more readily support a heavier mesh 300 and/or shoe 310. As shown in FIG. 13, for example, the non-rotatable connection between support bar 436 and platform 450 may allow support arm 430 to support a shoe 456 with a contact plate 457 having a vertical length 458 that is sized approximate to a standard height of side bars 7, and thus longer than vertical length 315 of contact plate 314 shown in FIG. 11, making it less likely that smaller logs 3 will pop out from between side rails 7. Because it is larger, shoe 456 of FIG. 13 may be heavier than shoe 310 of FIG. 11.

Although not shown in FIG. 13, it is contemplated that support bar 436 may be rotatably attached to platform 450 in any manner described above for support bar 36, although that may not be necessary due to the sliding capabilities of platform body 451. For example, a plurality of support arms 430 may be non-rotatably attached to platform body 451 with support bar 436 and slidable therewith in first direction 361 until the formfitting abutment is established between the plurality of support arms 430 and plurality of side surfaces 4. As demonstrated by this example, and others, the term "move" may thus comprise sliding and/or rotating support arm 430 toward plurality of side surfaces 4 to establish the formfitting abutment.

Support arms 30 also may be extended toward plurality of side surfaces 4. For example, an unbinding apparatus 520 is now described with reference to FIGS. 14-16 as comprising a support arm 530 that is telescopically extendable from a base structure 510. Similar to above, support arm 530 may comprise a forward segment 532 and a rearward segment 533; and base structure 510 may comprise columns 513, girders 514, and beams 515. As before, columns 513 and girders 514 may comprise structural shapes (e.g., steel tubes and/or I-beams) that are fixedly attached together (e.g., welded) to form stable, moment-resisting frames spaced apart from one another, and beams 515 may comprise a structural shape (e.g., a steel tube) extending between the moment-resisting frames. An additional guide surface 511 of base structure 510 may comprise the top surfaces of girders 514, beams 515 and/or a decking material attached thereto.

Figure 14:
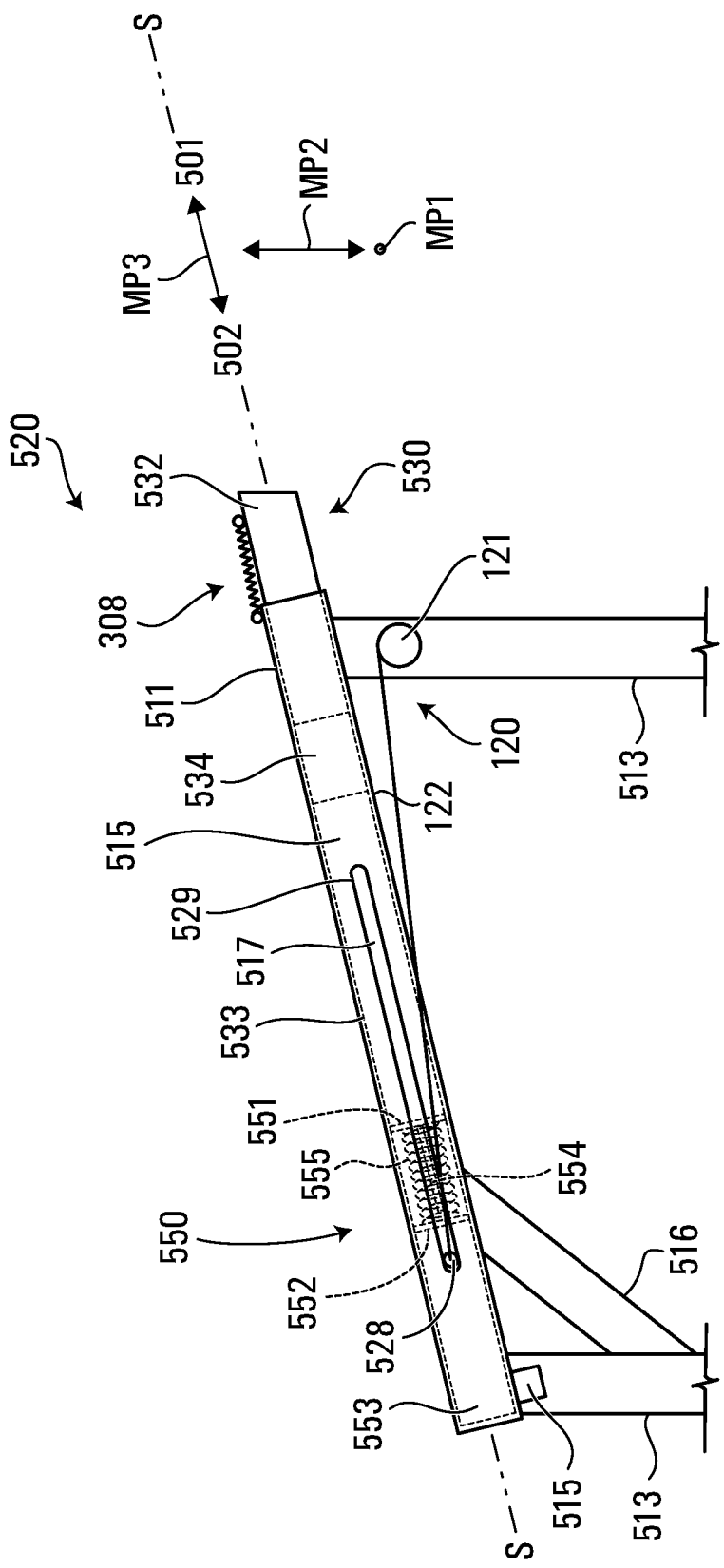
FIG. 14 depicts a side view of an exemplary unbinding apparatus and system comprising a plurality of support arms movable toward a plurality of side surfaces of a stacked load.
Figure 15:
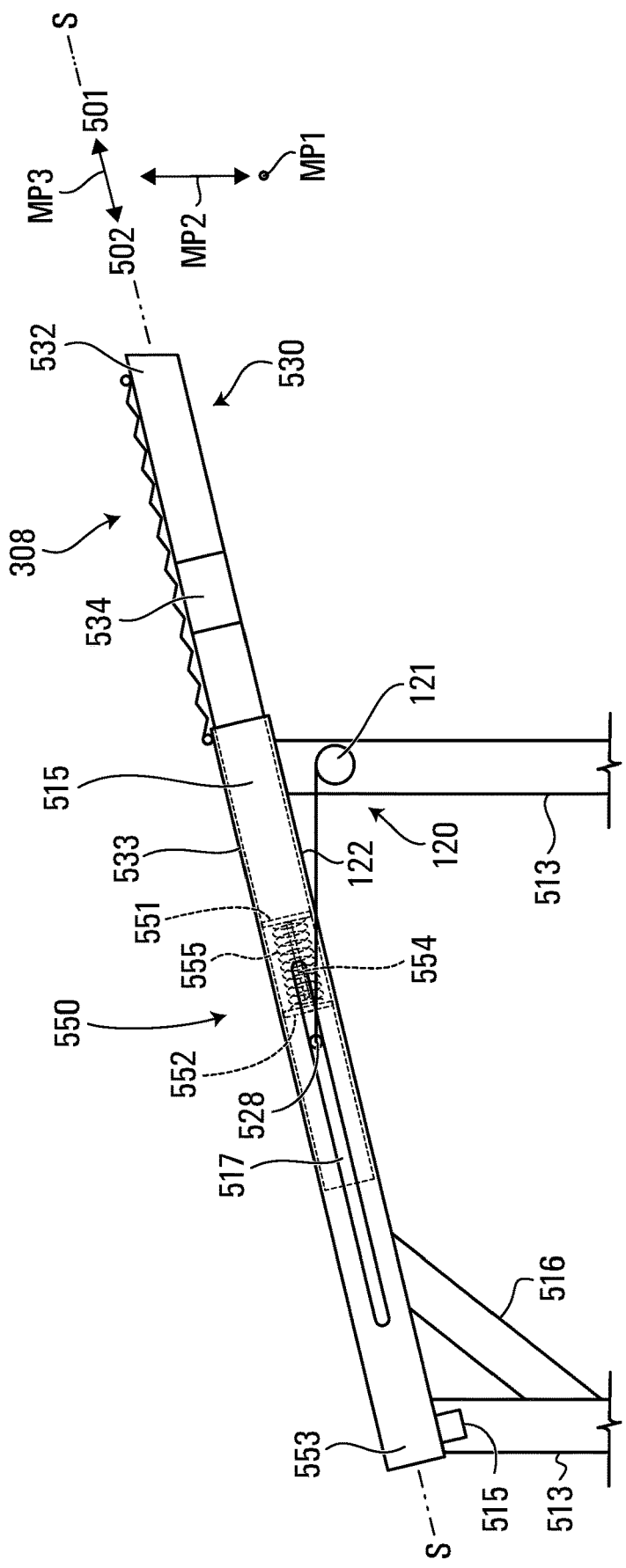
FIG. 15 depicts another side view of the FIG. 14 apparatus and system.
Figure 16:
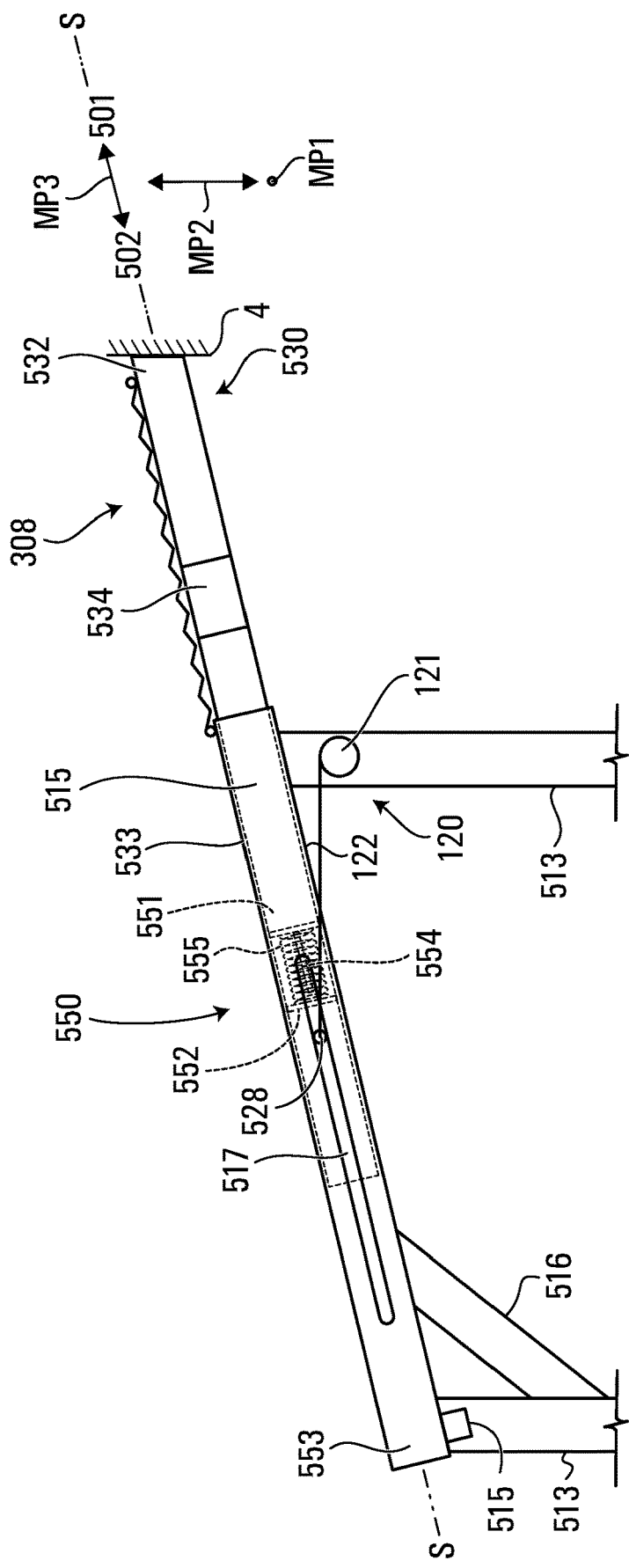
FIG. 16 depicts another side view of the FIG. 14 apparatus and system.

As shown in FIGS. 14-16, for example, girder 514 may comprise a steel tube having a rectangular cross-sectional area defining a cavity 517. Support arm 530 may be telescopically retracted in to and extendable out from cavity 517. As shown in FIG. 14, for example, forward segment 532 and rearward segment 533 may be aligned with support arm axis S-S when support arm 530 is retracted into cavity 517. As shown in FIGS. 15 and 16, for example, forward segment 532 may move independently of rearward segment 533, and thus no longer be aligned with support arm axis S-S, when extended from cavity 517. As also shown, forward segment 532 may be movably attached to rearward segment 533 with a rearward joint 534 adapted to permit movements of forward segment 532 relative to rearward segment 533 along first movement path MP1 (e.g., in a longitudinal direction relative to longitudinal axis X-X of unbinding area 10) and/or second movement path MP2 (e.g., in a vertical direction relative to axis X-X) when extended out of cavity 517. Forward segment 532 may comprise any structures described above with reference to forward segment 32. Rearward joint 534 may comprise any structures described above with reference to rearward joint 34 and/or forward joint 35.

Rearward segment 533 may be longer than rearward segment 33 and operable with drive element 120 to telescopically extend and retract forward segment 532 from cavity 517 along a third motion path MP3 that is generally parallel with support arm axis S-S. As shown in FIG. 14, for example, drive unit 120 may similarly comprise winch 121 with cable 122 extending therefrom. Cable 122 may extend from winch 121 to an attachment 528 (e.g., a steel bolt or rod) on rearward segment 533 that extends outwardly therefrom through a slot 529 extending through a sidewall of girder 514. Winch 121 may be similarly operable to rotate spool 124 (e.g., as in FIG. 8) in a first drive direction responsive to a first control signal from controller 130 and a second, opposite drive direction responsive to a second control signal from controller 130. As shown in FIG. 15, rotating spool 124 in the first drive direction may retract cable 122, causing forward segment 532 to telescopically extend out of cavity 517 in first direction 501 along third motion path MP3 by sliding exterior surfaces of support arm 530 past interior surfaces of cavity 517 responsive to a pull force applied by cable 122 until attachment 528 makes contact with an end of slot 529. As shown in FIG. 14, for example, rotating spool 124 in the second drive direction may extend cable 122, causing support arm 530 to telescopically retract back into cavity 517 in second direction 502 along third motion path MP3 by sliding the exterior surfaces of support arm 530 past the interior surfaces of cavity 517 responsive to gravity forces. Exterior surfaces of attachment 428 and/or rearward segment 533 may thus be operable with interior surfaces of slot 529 and/or cavity 517 to guide movements of support arm 530 in directions 501 and 502 along third movement path MP3.

As shown in FIGS. 14 and 15, for example, an extendable-retractable mesh 308 may be attached to base structure 510 and forward segment 532 of support arm 530. Similar to mesh 300, extendable-retractable mesh 308 may extend across support arm 530 and/or span between groups of support arm 530 to provide operator 1 with a continuous layer of protection against logs 3 and/or debris associated therewith. In contrast to mesh 300, extendable-retractable mesh 308 may comprise an accordion body that collapses when support arm 530 is retracted along third motion path MP3, as shown in FIG. 14; and expands when support arm 530 is extended along third motion path MP3, as shown in FIG. 15. The accordion body may have a cross-sectional shape that is self-supporting along rotational axis R-R so that it extends outwardly from support arm 530 and/or spans between different support arms 530 with minimal deflection. Extendable-retractable mesh 308 may be attached to forward segment 532 and rest on rearward segment 533 to accommodate independent movements of forward segment 532.

As also shown in FIGS. 14-16, for example, rearward segment 533 may comprise a longitudinal biasing element 550 adapted to control movements of support arm 530 along third movement path MP3. Longitudinal biasing element 550 may comprise a forward plate 551, a rearward plate 552, a leg 553, a rod 554, and a resilient element 555. Forward plate 551 may be attached to a rearward segment of rearward segment 533. Rearward plate 552 may be attached to a forward end of leg 553, which may comprise a structural shape (e.g., a steel tube) similar to segment 533. Attachment element 528 may be attached to leg 553 so that pull forces applied by cable 122 may be act through longitudinal biasing element 550. Rod 554 may extend outwardly from plate 552 towards an opening in plate 551. Resilient element 555 may comprise a spring (e.g., a steel coil spring) that is wrapped about rod 554, contained between plates 551 and 552, and sized to apply an expansion force to plates 551 and 552 that maintains a length of rearward segment 533 absent external forces applied thereto.

As shown in FIG. 16, for example, forward segment 533 may be slid in first direction 501 until it makes contact with a side surface 4, which may push back against forward segment 533 with a reaction force applied in direction 502 when and/or after contact is made (e.g., if a log 3 in stacked load 2 shifts). Because leg 553 is attached to cable 122 via attachment 528, making it unable to slide in second direction 502, the reaction force may move forward plate 551 toward rearward plate 552 until an end of rod 554 is received in the opening of plate 551 and/or resilient element 555 is compressed between plates 551 and 552. As shown in FIG. 15, for example, resilient element 555 may compress and expand relative to the reaction force until it obtains an equilibrium length, at which forward segment 532 may be firmly pressed against side surface 4 with the expansion force of resilient element 555 to maintain the formfitting abutment. It is contemplated that the expansion force applied by longitudinal biasing element 550 may be similarly applied by different structures comprising different resilient elements 555. Similar forces also may be applied by other elements of unbinding system 100, such as by activating drive element 120 with controller 130 responsive to data output by sensor 134.

Figure 17:
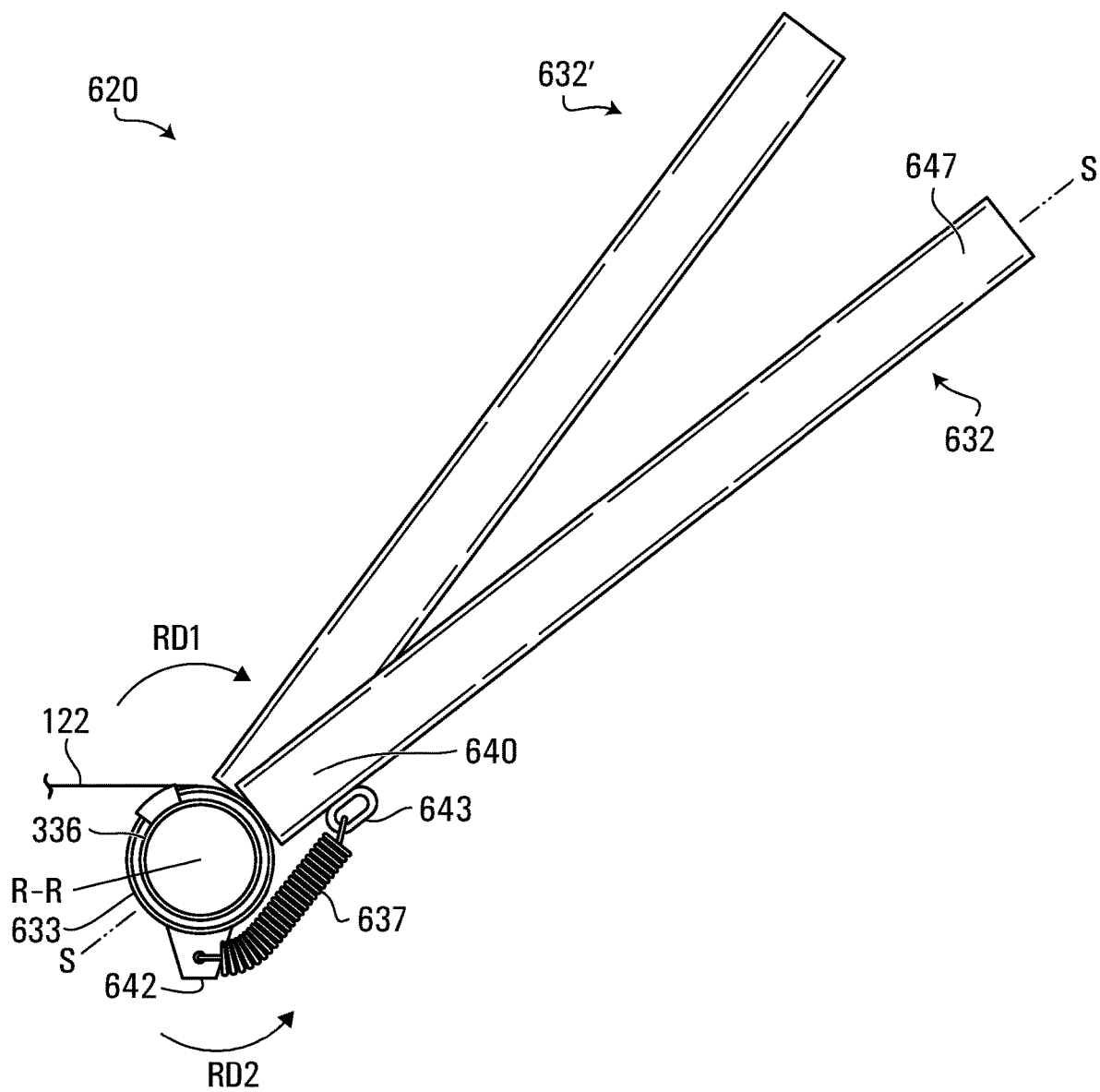
FIG. 17 depicts a side view of an exemplary unbinding apparatus and system comprising a plurality of support arms movable toward a plurality of side surfaces of a stacked load.

Each support arm 30 may be independently movable by any means described herein and/or any combination thereof. To provide further examples, an unbinding apparatus 620 is now described with reference to FIGS. 17 and 18, which depicts a group or plurality of support arms 601 comprising a support arm 630, a support 630', and a support arm 630". Each support arm 630, 630', and 630" may comprise a forward segment 632, 632', or 632" like forward segment 32 and a rearward segment 633, 633', or 633" like rearward segment 33. Forward segments 632, 632', and 632" may be attached to rearward segments 633, 633', and 633," which may be movably attached to a support bar 636 like support bar 36. Each support arm 630, 630', and 630" may be independently movable relative to at least one other support arm 630, 630', or 630" in at least one direction. As shown in FIG. 17, for example, each forward segment 632, 632', and 632" may comprise a structural shape (e.g., a steel tube) extending between a connecting end 640, 640', or 640" and a contact end 647, 647', or 647" along a support arm axis S-S. In contrast to arm 30, the structural shape of each forward segment 632, 632', and 632" may be continuous, meaning that support arms 630, 630', and 630" may not comprise a joint (e.g., such as joint 34 or 35). Each connecting end 640, 640', and 640" may be fixedly attached (e.g., welded) to one of rearward segment rearward segments 633, 633', and 633" so that they are rotatable together about rotational axis R-R in first rotational direction RD1 and second rotational direction RD2.

As shown in FIG. 17, for example, each rearward segment 633, 633', and 633" may comprise a cylindrical structure (e.g., a steel tube) with notches 650, 650', or 650". Interior surfaces of the cylindrical structure may be rotatable on exterior surfaces of support bar 636, which may comprise surface treatments (e.g., smoothed surfaces) adapted to reduce friction therebetween. As shown in FIG. 17, for example, support bar 636 may comprise protrusions 652, 652', or 652" (e.g., steel plates) operable with notches 650, 650', or 650" to control rotations of support arms 630, 630', and 630" about rotational axis R-R. In this example, support arm 630 may be rotated in first rotational direction RD1 until protrusions 652 contact first interior surfaces of notches 650 and in second rotational direction RD2 until protrusions 652 contact a second interior surfaces of notches 650 so that a rotational range of support arm 630 about rotational axis R-R is defined by an arc length between the interior surfaces of notches 650.

Figure 18:
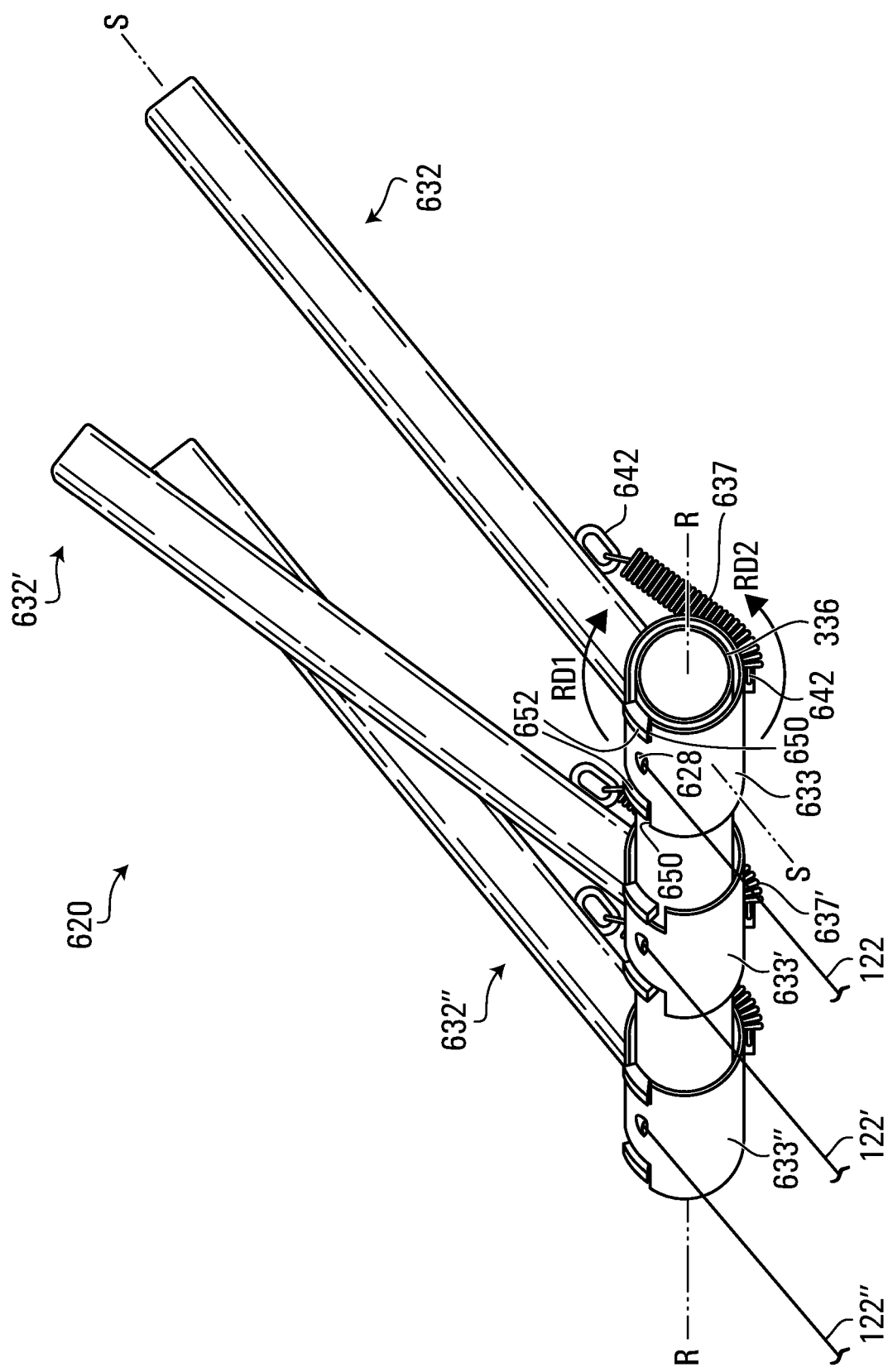
FIG. 18 depicts a perspective view of the FIG. 17 apparatus and system.

As show in FIGS. 17 and 18, for example, support arms 630, 630', and 630" may be operable with one or more drive elements 120. As shown in FIG. 17, for example, a different cable 122, 122', or 122" may extend from a different drive element 120 (e.g., not shown, but as described above) to an attachment 628, 628', or 628" on each rearward segment 633, 633', and 633". Similar to as described above, each drive element 120 may be operable to pull cables 122, 122', and 122" in a first drive direction responsive to a first control signal from controller 130 and release cable 122 in a second, opposite drive direction responsive to a second control signal from controller 130, such that each support arm 630, 630', and 630" is independently rotatable with controller 130. As shown in FIGS. 17 and 18, for example, pulling any cable 122, 122', or 122" in the first drive direction may retract it, causing support arm 630 to rotate away from stacked load 2 in second rotational direction RD2; and releasing any cable 122, 122', or 122" in the second drive direction may extend it, causing support arm 630 to rotate toward stacked load 2 in first rotational direction RD1.

Similar to above, each support arm 630, 630', and 630" may comprise at least one resilient element 637, 637', or 637" (e.g., a steel spring, a spring steel bar, an elastic loop, etc.) operable to control movements of its forward segment 632, 632', or 632". As shown in FIGS. 17 and 18, for example, resilient element 637 may comprise a spring (e.g., a steel coil spring) extending between an attachment 642 (e.g., a steel plate) on support bar 636 and an attachment 643 (e.g., a steel loop) on forward segment 632. The spring may be sized to apply a biasing force to attachments 642 and 643 that presses forward segment 632 against plurality of side surfaces 4 of stacked load 2 after its rearward segment has been rotated in first rotational direction RD1. Resilient elements 637' and 637" may be similarly configured. As shown in FIG. 17, for example, support arm 630' may rotate away from plurality of side surfaces 4 to a greater degree in second rotational direction RD2 relative to support arms 630 and 630" responsive to a physical shape of side surfaces 4 in front of support arm 630' that is more pronounced the physical shapes of side surfaces 4 in front of support arms 630 and 630". In this example, in keeping with above, resilient element 637' of middle support arm 630' may expand when support arm 630' is rotated in second rotational direction RD2 so that the resulting biasing force may be applied against plurality of side surfaces 4 to maintain the formfitting abutment between the support arms 630, 630', and 630" and plurality of side surfaces 4. Forward segments 632, 632', or 632" of support arms 630, 630', and 630" may thus be pressed against plurality of side surfaces 4 by forces applied by resilient elements 637, 637', or 637" in a manner similar to forward segment 532 of support arm 530 described above.

Any functions described above with respect to apparatus 20, system 100, and any variation or iteration thereof may be performed with method steps. For example, an exemplary unbinding method may comprise: moving a plurality of support arms 101 toward a plurality of side surfaces 4 of stacked load 2; and, for each support arm 30 of plurality of support arms 101: adjusting support arm 30 to abut against one or more side surfaces of plurality of side surfaces 4; and independently moving support arm 30 relative to plurality of support arms 101 in one or more directions responsive to a physical shape of the one or more side surfaces to establish a formfitting abutment between plurality of support arms 101 and plurality of side surfaces 4. Once the formfitting abutment is established, guide surfaces 102 of plurality of support arms 101 may be positioned and operative to guide a log 3 released from stacked load 2 along an escape path E1 over and away from an unbinding area 10 adjacent stacked load 2.

Aspects of the moving step, adjusting step, and formfitting step may be modified to accommodate different unbinding apparatus 20 and/or systems 100. For example, the moving step may comprise rotating, sliding, and/or extending each support arm 30 of plurality of support arms 101; the adjusting step may comprise moving a forward segment 32 of each support arm 30 relative to a rearward segment 33 of each support arm 30 in the one or more directions; and the formfitting step may comprise moving any of plurality of support arms 30 relative to plurality of side surfaces 4. In keeping with above, the method also may comprise: receiving, with controller 130, input data from input device 133; and causing, with controller 130, drive element 120 to move plurality of support arms 30 responsive to the input data. The method also may comprise: receiving, with controller 130, measurement data from one or more sensors 134; and determining, with controller 130, whether the formfitting abutment has been established based on the measurement data.

While principles of the present disclosure are described herein with reference to illustrative aspects for particular applications, the disclosure is not limited thereto. Those having ordinary skill in the art and access to the teachings provided herein will recognize additional modifications, applications, aspects, and substitution of equivalents all fall in the scope of the aspects described herein. Accordingly, the present disclosure is not to be considered as limited by the foregoing description.

Embodiments in which an exclusive property or privilege is claimed are defined as follows:

1. An apparatus for unbinding a stacked load of logs, the apparatus comprising:
   a plurality of support arms movable toward a plurality of side surfaces of the stacked load,
   each support arm of the plurality of support arms comprising a guide surface and being:
   adjustable to abut against one or more side surfaces of the plurality of side surfaces, and
   independently movable relative to the plurality of support arms in one or more directions responsive to a physical shape of the one or more side surfaces to establish a formfitting abutment between the plurality of support arms and the plurality of side surfaces,
   wherein, once the formfitting abutment is established, the guide surfaces of the plurality of support arms are positioned and operative to guide a log released from the stacked load along an escape path over and away from an unbinding area adjacent the stacked load.

2. The apparatus of claim 1, wherein the plurality of support arms are rotatable, slidable, or extendable toward the plurality of side surfaces.

3. The apparatus of claim 2, wherein each support arm of the plurality of support arms is: attached to a slide body; and slideable toward the plurality of side surfaces with the slide body.

4. The apparatus of claim 2, wherein a portion of each support arm of the plurality of support arms is:
   retractable into an interior cavity of a base structure when the support arm is slid away from the plurality of side surfaces; and
   extendable from the interior cavity when the support arm is slid toward the plurality of side surfaces.

5. The apparatus of claim 4, comprising a mesh that:
   spans between two or more support arms of the plurality of support arms;
   contracts when the portions of the two or more support arms are retracted into their interior cavities; and
   expands when the portions of the two or more support arms are extended into their interior cavities.

6. The apparatus of claim 5, wherein each support arm of the plurality of support arms comprises:
   a forward segment abuttable against the physical shape; and
   a rearward segment operable to slide the forward segment toward the physical shape.

7. The apparatus of claim 6, wherein, for each support arm of the plurality of support arms, the forward segment is independently moveable relative to the rearward segment in the one or more directions when the portion of the support arm is extended out of the interior cavity.

8. The apparatus of claim 7, wherein, for each support arm of the plurality of support arms, the forward segment is attached to the rearward segment by a resilient element that:
deflects to permit movements of the forward segment away from the physical feature; and
expands to press the forward segment into the one or more side surfaces.

9. The apparatus of claim 1, wherein each support arm of the plurality of support arms comprises:
a forward segment abuttable against the physical shape; and
a rearward segment operable to move the forward segment toward the physical shape.

10. The apparatus of claim 9, wherein, for each support arm of the plurality of support arms, the forward segment is independently moveable relative to the rearward segment in the one or more directions.

11. The apparatus of claim 10, wherein the one or more directions comprise one of:
a longitudinal movement direction relative to the stacked load; and
a vertical movement direction relative to the stacked load.

12. The apparatus of claim 9, wherein:
each support arm of the plurality of support arms is movable toward the one or more side surfaces in an undeflected configuration where the forward segment is aligned with the rearward segment along a support arm axis; and
for each support arm of the plurality of support arms, the forward segment is independently movable relative to the rearward segment in the one or more directions into a deflected configuration where the forward segment is not aligned with the support arm axis.

13. The apparatus of claim 9, wherein, for each support arm of the plurality of support arms:
the rearward segment and the forward segment are rotatable toward the one or more side surfaces about a rotational axis; and
the forward segment is independently movable relative to the rearward segment in one of
a first direction generally parallel with the rotational axis, and
a second direction generally perpendicular to the rotational axis.

14. The apparatus of claim 13, wherein:
the rearward segment and the forward segment are rotatable relative to a base structure;
the rearward segment comprises stop surfaces; and
the rearward segment is rotatable about the rotational axis until one of the stop surfaces contacts a reaction shape of the base structure.

15. The apparatus of claim 9, wherein each support arm of the plurality of support arms comprises one or more joints permitting independent movements of the forward segment relative to the rearward segment in the one or more directions.

16. The apparatus of claim 15, wherein, for each support arm of the plurality of support arms, the one or more joints comprises:
a first joint adapted to permit rotational movements of the forward segment along a first motion path; and
a second joint adapted to permit rotational movements of the forward segment along a second motion path that intersects the first motion path.

17. The apparatus of claim 16, wherein:
the first joint is located on the rearward segment; and
the forward segment comprises:
a link segment extending between the first joint and the second joint; and
a contact segment extending outwardly from the second joint.

18. The apparatus of claim 17, wherein:
the link segment and the contact segment are aligned when the forward segment and the rearward segment are in an undeflected configuration where the forward segment is aligned with the rearward segment along a support arm axis; and
the contact segment is movable relative to one or both of the link segment and the rearward segment.

19. The apparatus of claim 17, wherein:
the link segment and the contact segment are independently rotatable relative to the rearward segment with the first joint; and
the contact segment is independently rotatable relative to the link segment with the second joint.

20. The apparatus of claim 1, wherein a group of the plurality of support arms are rotatable together toward a group of the plurality of side surfaces.

21. The apparatus claim 20, wherein the group of the plurality of support arms is rotatable:
toward the group of the plurality of side surfaces by causing a support bar to rotate about a rotational axis in a first rotational direction; and
away from the plurality side surfaces by causing the support bar to rotate about the rotational axis in a second rotational direction opposite of the first rotational direction.

22. The apparatus of claim 21, wherein the support bar is rotatable in the first rotational direction responsive to a gravity force applied to the support bar and the second rotational direction responsive to a torque applied to the support bar.

23. The apparatus of claim 22, wherein the support bar is rotatable in the first rotational direction by unwinding a cable with a drive unit and the second rotational direction by winding the cable with the drive unit.

24. The apparatus of claim 1, comprising one or more resilient elements adapted to control movements of the plurality of support arms relative to the plurality of side surfaces.

25. The apparatus of claim 24, wherein each support arm of the plurality of support arms comprises:
a first resilient element adapted to control movements of the forward segment in a generally vertical direction of the one or more directions; and
a second resilient element adapted to control movements of the forward segment in a first generally longitudinal direction of the one or more directions.

26. The apparatus of claim 25, wherein each support arm of the plurality of support arms comprises:
a third resilient element adapted to control movements of the forward segment in a second generally longitudinal direction of the one or more directions that is opposite of the first generally longitudinal direction.

27. The apparatus of claim 26, wherein, for each support arm of the plurality of support arms, the second and third resilient elements are operable to maintain a longitudinal position of the support arm relative to the plurality of support arms absent external forces applied to the forward segment.

28. The apparatus of claim 1, comprising a mesh spanning between two or more support arms of the plurality of support arms.

29. The apparatus of claim 1, wherein:
each support arm of the plurality of support arms comprises a shoe with a contact plate sized to contact the one or more side surfaces; and
the contact plate comprises a generally vertical length sized to span across multiple logs in the stacked load.

30. The apparatus of claim 29, wherein:
the stacked load is contained between a row of side rails; and
the contact plate comprises a generally longitudinal length sized to span between two adjacent side rails in the row of side rails.

31. The apparatus of claim 30, wherein each shoe is rotatably attached to at least one support arm of the plurality of support arms so that the contact plate rotates relative to the at least one support arm to remain generally aligned with the one or more side surfaces when the plurality of support arms are moved toward the plurality of side surfaces.

32. The apparatus of claim 1, wherein each support arm of the plurality of support arms is independently movable relative to each other support arm of the plurality of support arms.

33. The apparatus of claim 32, wherein each support arm of the plurality of support arms comprises:
a forward segment abuttable against the physical shape; and
a rearward segment that is fixedly attached to the forward segment, movably attached to a base structure, and independently movable relative to each other support arm and the base structure to move the forward segment toward the physical shape in the one or more directions.

34. The apparatus of claim 33, wherein each support arm of the plurality of support arms comprises a resilient element adapted to bias the forward segment toward the physical shape.

35. A system for unbinding a stacked load of logs, the system comprising:
at least one apparatus for unbinding the stacked load, each apparatus comprising:
a plurality of support arms movable toward a plurality of side surfaces of the stacked load,
each support arm of the plurality of support arms comprising a guide surface and being:
adjustable to abut against one or more side surfaces of the plurality of side surfaces, and
independently movable relative to the plurality of support arms in one or more directions responsive to a physical shape of the one or more side surfaces to establish a formfitting abutment between the plurality of support arms and the plurality of side surfaces,
wherein, once the formfitting abutment is established, the guide surfaces of the plurality of support arms are positioned and operative to guide a log released from the stacked load along an escape path over and away from an unbinding area adjacent the stacked load.

36. The system of claim 35, comprising a base structure adapted to position the at least one apparatus relative to the unbinding area.

37. The system of claim 36, wherein:
the base structure comprises an additional guide surface and defines a covered operating area adjacent the unbinding area; and
once the formfitting abutment is established, the additional guide surface of the base structure is positioned and operative to guide the log released from the stacked load along a second escape path over and away from the covered operating area.

38. The system of claim 37, wherein the base structure comprises a mesh adapted to contain the log after being guided along the second escape path.

39. The system of claim 38, comprising a retaining structure adapted to contain the log after being guided along the second escape path.

40. The system of claim 35, comprising a plurality of drive units operable to move the plurality of support arms toward the plurality of side surfaces.

41. The system of claim 35, comprising at least one of:
an input device operable to activate the plurality of drive elements;
a controller operable with the input device to cause the plurality of drive elements to move the plurality of support arms;
a signalling device operable with the controller to output audiovisual signals indicating whether formfitting abutment is established; and
one or more sensors adapted to output measurement data to the controller for determining whether formfitting abutment is established.

42. The system of claim 41, wherein the input device comprises a user interface that is physically located and only operable within the covered operating area of the base structure.

43. The system of claim 42, wherein the one or more sensors comprises one of:
a force sensor associated with the plurality of drive elements;
a visual sensor oriented toward the unbinding area; and
a pressure sensor located on one or more of the support arms.

44. The system of claim 43, wherein the controller is adapted to identify an operator of the system based on data output with the one or more sensors.

45. The system of claim 44, wherein one or both of the input device and the controller comprises an application operable with a mobile computing device to cause movements of the plurality of support arms when the mobile computing device is not located in the unbinding area.

46. A system for unbinding a stacked load of logs, the system comprising:
a first apparatus for unbinding the stacked load, the first apparatus being located on a first side of the stacked load and comprising:
a plurality of first support arms movable toward a plurality of first side surfaces on the first side of the stacked load,
each first support arm of the plurality of first support arms comprising a first guide surface and being:
adjustable to abut against one or more first side surfaces of the plurality of first side surfaces, and
independently movable relative to the plurality of first support arms in one or more directions responsive to a physical shape of the one or more first side surfaces to establish a first formfitting abutment between the plurality of first support arms and the plurality of first side surfaces; and a second apparatus for unbinding the stacked load, the second apparatus being located on a second side of the stacked load and comprising:

a plurality of second support arms movable toward a plurality of second side surfaces on the second side of the stacked load, each second support arm of the plurality of second support arms comprising a second guide surface and being:

adjustable to abut against one or more second side surfaces of the plurality of second side surfaces, and independently movable relative to the plurality of second support arms in one or more directions responsive to a physical shape of the one or more second side surfaces to establish a second formfitting abutment between the plurality of second support arms and the plurality of second side surfaces, wherein, once the first and second formfitting abutments are established, the first and second guide surfaces of the respective pluralities of first and second support arms are positioned and operative to guide a log released from the stacked load along either a first escape path over and away from a first unbinding area adjacent the first side of the stacked load or a second escape path over and away from a second unbinding area adjacent the second side of the stacked load.

47. The system of claim 46, comprising controller operable to activate one or more drive units of the plurality of drive units.

* * * * *